United States Patent [19]

Aggers et al.

[11] Patent Number: 5,039,980
[45] Date of Patent: Aug. 13, 1991

[54] MULTI-NODAL COMMUNICATION NETWORK WITH COORDINATED RESPONSIBILITY FOR GLOBAL FUNCTIONS BY THE NODES

[75] Inventors: John R. Aggers, Apple Valley; Edward Schwarz, Minneapolis, both of Minn.

[73] Assignee: Honeywell Inc., Minneapolis, Minn.

[21] Appl. No.: 471,188

[22] Filed: Jan. 26, 1990

[51] Int. Cl.⁵ .............................................. G08B 29/00
[52] U.S. Cl. ................................. 340/506; 340/505; 340/517; 340/531; 340/825.06; 340/825.52
[58] Field of Search ............... 340/506, 505, 517, 518, 340/531, 825.06, 825.52, 825.07, 825.08, 825.09

[56] References Cited

U.S. PATENT DOCUMENTS

| | | |
|---|---|---|
| 3,716,096 | 2/1973 | Berrett et al. |
| 4,319,338 | 3/1982 | Grudowski et al. |
| 4,527,247 | 7/1985 | Kaiser et al. |
| 4,635,182 | 1/1987 | Hintz |
| 4,740,882 | 4/1988 | Miller |
| 4,742,475 | 5/1988 | Kaiser et al. |

Primary Examiner—Donnie L. Crosland
Attorney, Agent, or Firm—Edward Schwarz

[57] ABSTRACT

An electronic network of communication and processing nodes particularly suitable for control of environmental systems has pluralities of the nodes which are sources for certain types of status messages each of which comprise communication of a particular kind of information on the network. To resolve the question of which of the nodes shall furnish each type of status message, one node is designated the coordinator node, and it stores a status message source list which associates the node assigned for each type of status message with the status message type itself and transmits all or a part of the list on the network to allow each of the status message source nodes to determine therefrom their responsibility with respect to each status message type. These status message source nodes can also transmit request messages on the network by which they request responsibility for furnishing a particular type of status message. Upon acceptance of the request in a request message, the coordinator node enters the node transmitting the request message into the status message source list in asociation with the status message type. In one embodiment, the coordinator node monitors the transmission of status messages on the network and if an instance arises where a status message is supplied by other than the one specified in the status message source list, takes remedial action. In another embodiment each node is given a priority for a particular type of status message, allowing the coordinator node to replace a node assigned to a particular type of status message with another node.

25 Claims, 7 Drawing Sheets

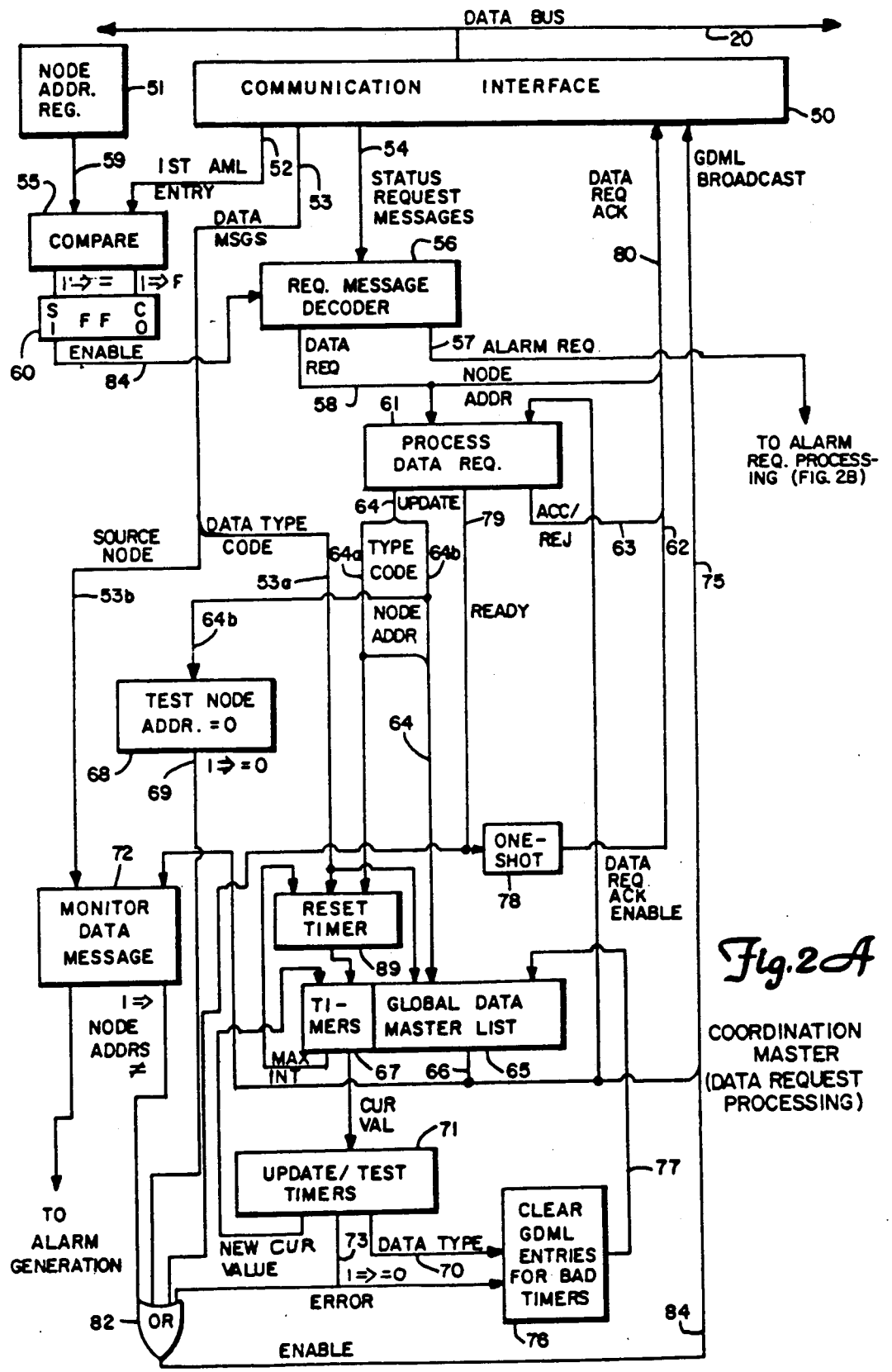

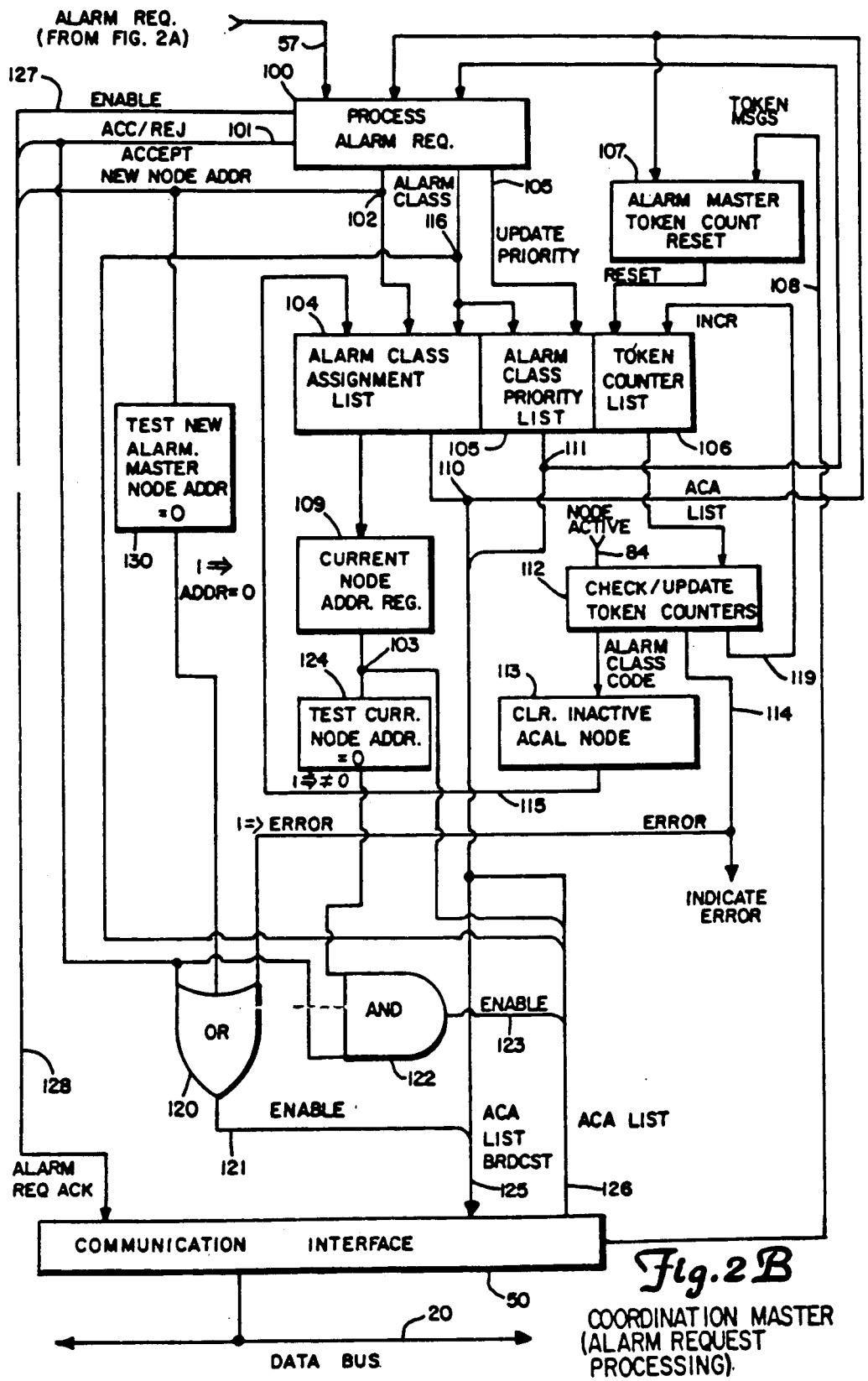
Fig. 2B COORDINATION MASTER (ALARM REQUEST PROCESSING)

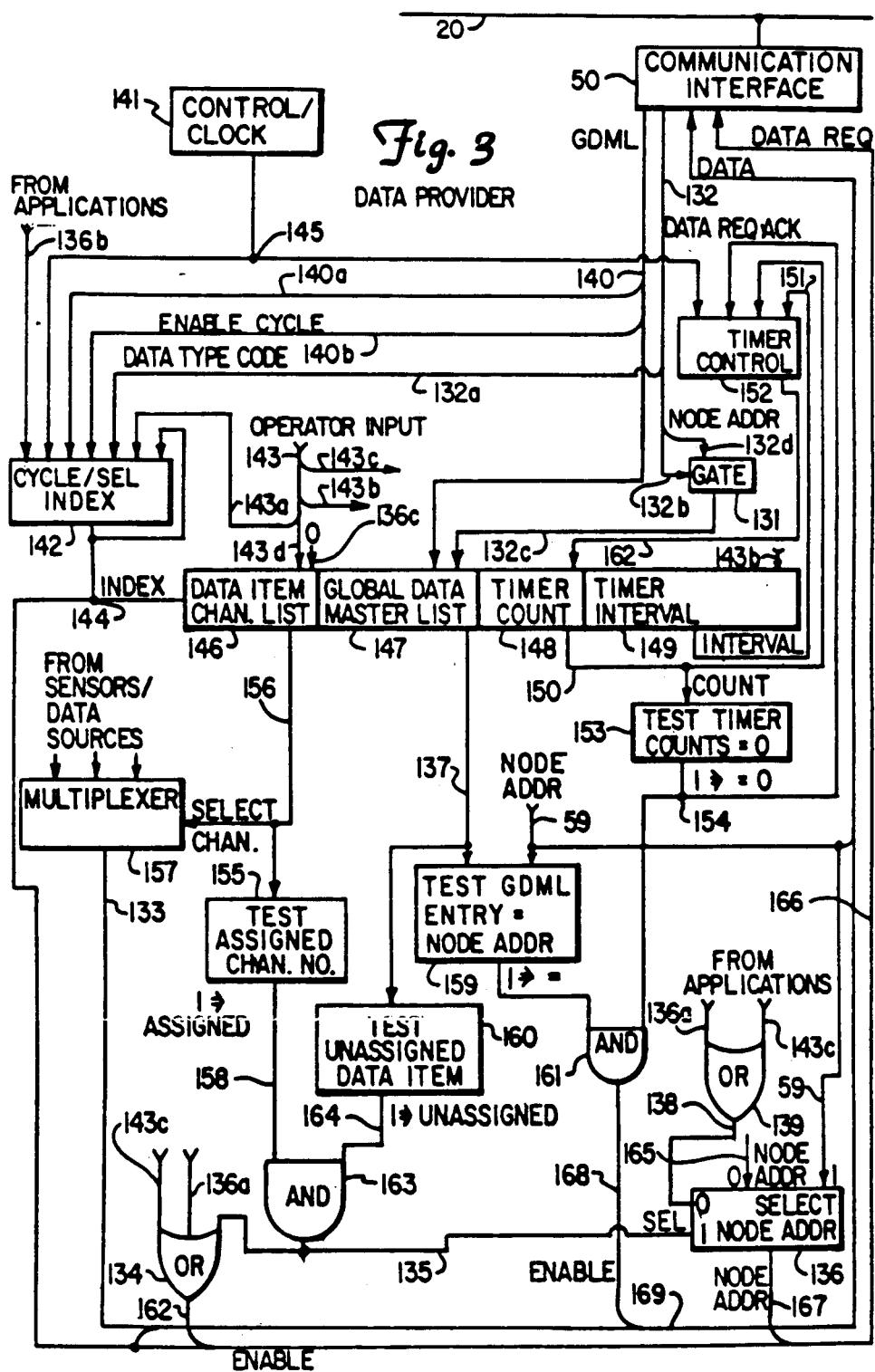

ALARM MASTER

MESSAGE FORMATS

ACTIVE MASTER LIST (AML)

| AML CODE | 1ST ENTRY | 2ND ENTRY | . . . | LAST ENTRY |
|---|---|---|---|---|

GLOBAL DATA MASTER LIST

| CAML LIST CODE | 1ST SOURCE NODE | 2ND SOURCE NODE | . . . . | LAST SOURCE NODE |
|---|---|---|---|---|

GLOBAL DATA MASTER LIST (GDML) BROADCAST

| GDML CODE | 1ST ENTRY | 2ND ENTRY | . . . | LAST ENTRY |
|---|---|---|---|---|

DATA MESSAGE

| DATA MSG. CODE | SOURCE NODE ADDR. | DATA TYPE CODE | DATA |
|---|---|---|---|

DATA REQUEST

| DATA REQ. CODE | SOURCE NODE ADDR. | DATA TYPE CODE |
|---|---|---|

DATA REQUEST ACKNOWLEDGE

| DATA REQ ACKNOWLEDGE CODE | SOURCE NODE ADDR. | DEST. NODE ADDR. | DATA TYPE CODE | ACC/REJ FLAG |
|---|---|---|---|---|

ALARM REQUEST

| ALARM REQ. CODE | SOURCE NODE ADDR. | ALARM CLASS CODE | NODE ALARM PRIORITY |
|---|---|---|---|

ALARM REQUEST ACKNOWLEDGE

| ALARM REQ. ACKNOWLEDGE CODE | SOURCE NODE ADDR. | DEST. NODE ADDR. | ALARM CLASS CODE | ACC/REJ FLAG |
|---|---|---|---|---|

*Fig. 5A*

| ALARM CLASS ASSIGNMENT LIST (ACAL) MESSAGE | ACAL CODE | ACAL MSG. DEST. NODE ADDR | 1ST CLASS NODE | 1ST ENTRY PRIORITY | 2ND CLASS NODE |
|---|---|---|---|---|---|
| | 2ND ENTRY PRIORITY | . . . | LAST CLASS NODE | LAST ENTRY PRIORITY | |

| ALARM CLASS ASSIGNMENT LIST (ACAL) BROADCAST | ACAL BRDCST CODE | 1ST CLASS NODE | 1ST ENTRY PRIORITY | 2ND CLASS NODE | 2ND ENTRY PRIORITY | . . . |
|---|---|---|---|---|---|---|
| | . . . | LAST CLASS NODE | LAST ENTRY PRIORITY | | | |

| ALARM | ALARM MSG. CODE | ALARM MSG. SOURCE NODE. ADDR. | ALARM CLASS CODE | ALARM ID CODE | ALARM ID CODE | . . . |
|---|---|---|---|---|---|---|

| ALARM ACKNOWLEDGE | ALARM ACK CODE | ALARM MSG. DEST. NODE ADDR. | ALARM CLASS CODE | ALARM ID CODE |
|---|---|---|---|---|

| ACA LIST ACKNOWLEDGE | ACA LIST ACK CODE | SORCE NODE ADDR. |
|---|---|---|

*Fig. 5B*

TABLE FORMAT

| DATA ITEM TIMERS | 1ST MAX. INTERVAL | 1ST CURRENT TIME | 2ND MAX. INTERVAL | 2ND CURRENT TIME | . . . |
|---|---|---|---|---|---|
| | . . . | LAST MAX INTERVAL | LAST CURRENT TIME | | |

*Fig. 6*

MULTI-NODAL COMMUNICATION NETWORK WITH COORDINATED RESPONSIBILITY FOR GLOBAL FUNCTIONS BY THE NODES

BACKGROUND OF THE INVENTION

In many types of today's commercial, industrial and residential structures, the overall function of operating the structure and perhaps even controlling some or all of the activities within it is performed by a number of individual electronic computing devices spread around the structure. Efficient and safe performance of these functions requires that the individual devices execute the control algorithms as a coordinated group, and that this performance be relatively trouble-free over months and even years. A number of examples of functions to be controlled come to mind. First of course is the environmental control within the structure. But there are other functions as well which may be under computer control, and it may be advantageous to coordinate all of these activities by combining the computing devices into an interactive network, where each of the devices are connected to communicate with other devices.

For example, if the operation is a retail store of some size, there is a need for control of the individual cash registers, inventory management, warehousing, scheduling, fire alarms, etc. If the operation is a factory, there is raw materials and finished goods management, control of the manufacturing devices, process control, billing, payroll, etc. Each of the operations are characterized by the necessity of approximately real time control of the individual subsystems involved, all of which are spread over a substantial area, and yet must be controlled in a coordinated fashion. It is natural to turn to the cheap and reliable computing devices now available to perform the control functions and to manage the communication functions as well.

To accomplish these functions the individual computing devices are connected together by data paths over which information may flow between the individual devices in messages of various types. Usually the messages are encoded in electrical signals carried on electrical conductors. Such a group of connected computing devices may be referred to as a communications network, with the individual computing devices being referred to as nodes of the network. Typically each, or at least a number, of the nodes comprises a small microprocessor which performs communication and control functions needed by the system elements at the point where it is located.

There are a number of ways to configure these networks. One obvious configuration is to connect each of the nodes to every other node with an individual data path, but it can be seen that this will quickly result in an unmanageable number of data paths for all but the smallest networks. It is also possible to create a ring structure where each of the nodes receives data from one node and transmits data to another node in a ring or cyclic arrangement. This arrangement has many advantages, but it does require that communication between two nodes will involve information transfer through a number of different nodes until it reaches the destination node, increasing the complexity of communication management and network structure, and to some extent reducing the speed with which the information is transmitted. A third configuration, and the one for which the invention forming the subject of this patent is intended, uses a data bus configuration, where a single pair of conductors are connected to every one of the nodes. Data transmission occurs by the simple expedient of a node placing electrical signals on the data bus which each of the other nodes can then sense. The data bus itself in the network under consideration here may comprise a simple twisted pair conductor.

In such a system, the simplest design uses time multiplexing where, to prevent garbling of the individual messages when simultaneous signal transmissions (so-called collisions) occur, only one of the nodes is allowed to transmit at any given instant. This is one of the disadvantages of this configuration. Because messages cannot overlap timewise, the data rates tend to be relatively slow. On the other hand, using the simple twisted pair data bus reduces the effort required in installing it and in adding and removing nodes. Further, twisted pair data busses are cheaper than most other types of data paths.

In order to manage data transfer on the bus and prevent collisions of messages transmitted simultaneously, the nodes one at a time enter active mode intervals during which the node may provide on the data bus to the other nodes a signal encoding a plurality of different messages containing whatever information is specified by the control program being executed by the node's microprocessor. There is typically some type of activating message frequently referred to as a token message or simply a token, which is passed from one node to the next. After the node has received a token message and before it transmits a token message to another node, the node is active and can transmit messages on the bus. How the token message is passed and what determines the next recipient node when one node relinquishes the token message is not particularly important to this invention. Note however, that the token is passed in an order which allows all of a selected group of the nodes to become active within some predetermined time. Further, it is usually preferred that the token is passed in some preselected sequence whereby all of the nodes in the group receive and transmit the token before a node receives the token for a second time. The order in which nodes become active is subject to change as nodes are added to and removed from the bus.

To further manage this sequential process of nodes receiving the token and becoming active it is convenient to have a node address for each of the nodes by which each node may be identified. This node address is unique for each node, i.e., only one node on any network has a particular node address. The node address for each node is stored in a node address register. It is possible to program the nodes so that they will recognize their node address in destination fields in message on the bus and in this way may determine that particular messages are directed specifically to the particular node. For example, this capability is useful in passing the token to a specific node. It is also possible for a node to broadcast a message intended for all of the other nodes on the network. Such a broadcast message may have a particular field within itself whose bit pattern identifies it as a broadcast message.

The particular application for which the system to be described was designed involves control of the internal environment of a building, including the heating, air conditioning, and ventilating (HVAC) functions. There are safety, efficiency, and cost considerations involved in such a system so reliability is important, but the data rates are not extreme. If important information can be provided within a few seconds, this is usually adequate.

It is useful in such an application for certain of the nodes to serve as sources for status messages provided on the data bus, each of the status messages including information useful to other or perhaps all of the nodes on the network. There may be two or more classes of these status messages, and a number of different types of status messages within each class. For example in the HVAC application mentioned, one class of status messages may comprise environmental conditions whose levels are in some cases provided to individual nodes by sensors located at the appropriate point to measure the particular condition for which the sensor is designed. Another class may comprise alarm conditions within the controlled HVAC devices. Examples of environmental information may be time, outside temperature, or outside humidity. Alarm conditions may comprise excessive pressure or temperature in the boiler which furnishes the heat for the building, tripping of a circuit breaker, etc.

It is usually preferred that there be more than one sensor and more than one node capable of serving as the source for many of the particular types of these status messages. This insures that the status message will be available even if there is a failure of either the sensor or the node to which it provides its output. However, it is usually preferable that only a single source of a particular type of status message actually provide the message, one reason being simply to reduce traffic on the data bus. Furthermore, the sensors will frequently provide different values, and if different values are presented at successive intervals for use in the control algorithms, there is the possibility of unstable or at least inaccurate or inefficient control. It thus becomes desirable in these systems that there be a procedure to select and designate as the source node one of the several nodes having the capability to supply each type of status message.

BRIEF DESCRIPTION OF THE INVENTION

Coordination of the responsibility for transmitting each type of status message is performed cooperatively by the nodes capable of transmitting the type of status message whose source is being selected and by another node (which may also be a source node) which is called the coordinator node. The coordinator node has a memory in which a status message source list is stored. The status message source list associates the node address of one source node which can supply a particular type of status message with that type of status message. Once this association has been made, the coordinator node on occasion during its active mode broadcasts on the data bus all or a part of the status message source list in a status message source message which contains at least one status message type and the node address associated with it in the status message source list. All of the source nodes receive the status message source message. The source node which has in its node address register a value equal to the address of the node specified as the source of a status message by the status message source message then responds by transmitting while it is active, the status message type which is assigned to it in the status message source message. It can thus be seen that in this way one of the source nodes can be interactively conditioned to supply a particular status message, and other source nodes capable of supplying the same message are restrained from doing so.

This invention also provides means for selecting the source node for a particular status message type from among the potential candidates for the source node, for replacing a selected source node under certain circumstances, and for testing and monitoring the status messages and taking appropriate action if a source node whose address has not been entered into the status message source list for a particular status message is detected to have transmitted that status message.

The two types of status messages, data and alarm, must be treated slightly differently. Data types of status messages are usually sent at more or less regular intervals, so malfunction of the node supplying a particular data message will be detected by noting the absence of the message over a preselected time interval. Alarm master activity, however, is a function of the individual alarm master having responsibility for a particular class of alarms. Because of the potential for differences in operation among the alarm masters, mere failure to transmit alarm messages is not an indication of malfunction. Instead, the coordinator node tests that the nodes which process alarms are active in the sense that they transmit a token message to another node within a preselected time interval, and if so makes the assumption that the alarm function which the node has is operational.

Accordingly, one purpose of this invention is to provide a control system for the selection of sources for transmitting of status messages to nodes connected by a serial data bus.

Another purpose is to allow selection of individual status message source nodes on a first to sign up basis or alternatively according to a preselected priority.

Yet another purpose is to select a single source node for a data item message to be transmitted on the network.

A further purpose is to monitor the transmission of status messages on such a network and take appropriate corrective action such as redesignating the source node if other than the selected source node provides the status message.

Yet another purpose is to provide messages on the network identifying status messages not currently having a source node.

A still further purpose is to cause potential source nodes for status messages to periodically signal on the network their availability to provide the status messages.

Another purpose is to provide a framework for allowing nodes to replace those which have certain functions relating to status messages without interrupting operation of the system and without human intervention.

BRIEF DESCRIPTION OF THE DRAWINGS

FIG. 2A is a functional block diagram of the coordination master node functions providing overall control for the data provider node request operations of the invention.

FIG. 2B is a functional block diagram of the coordination master node functions providing overall control for the alarm master node request operations of the invention.

FIG. 3 is a functional block diagram of the master nodes providing data provider operations in the invention.

FIGS. 5A and 5B show the format of various messages transmitted on the data bus by the various nodes of the network in which the invention is implemented.

FIG. 6 shows the format of a coordination master timer table.

DESCRIPTION OF THE PREFERRED EMBODIMENT

General Considerations

Figure 1:
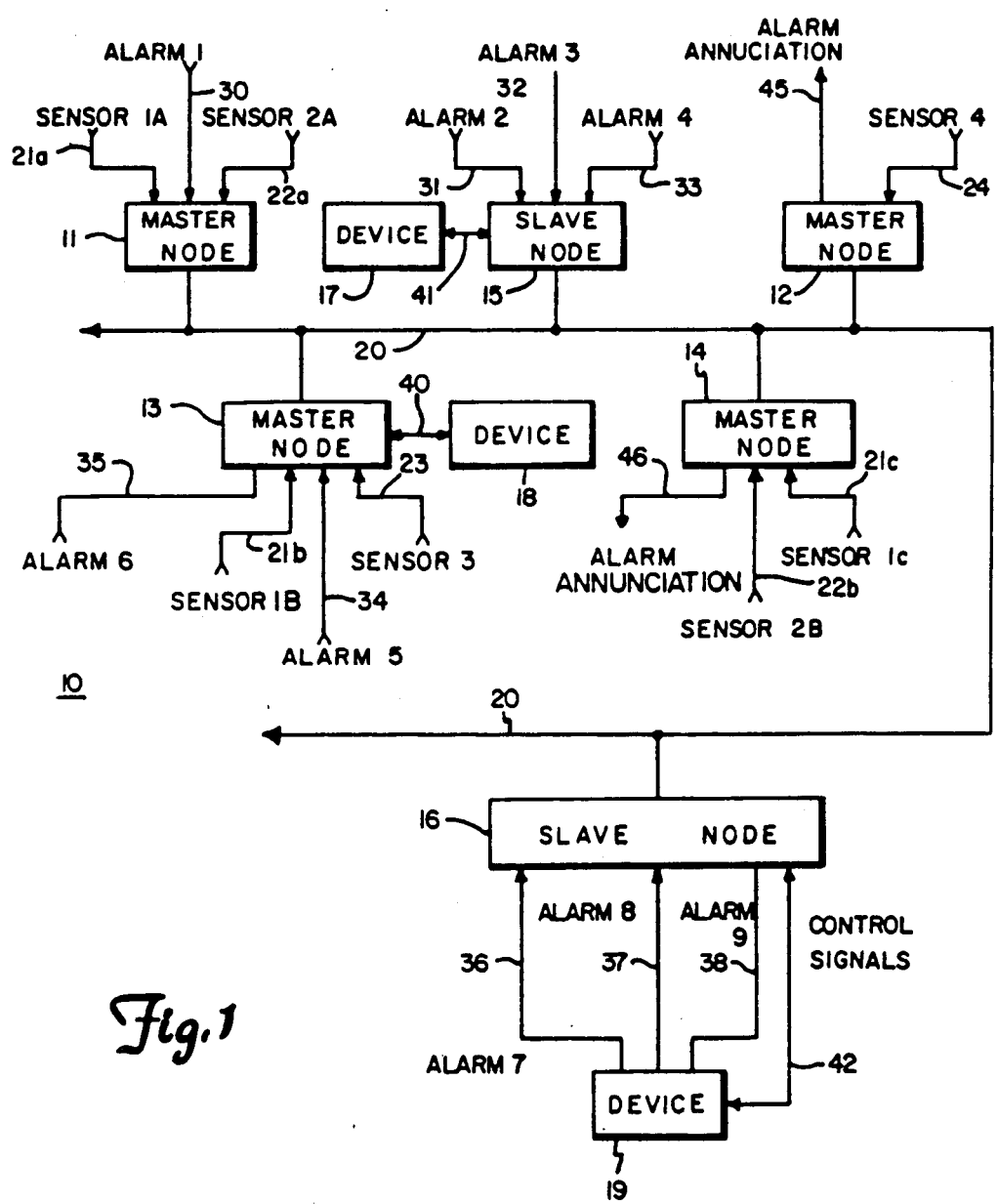
FIG. 1 is a system hardware block diagram in which the invention is configured.

As is apparent from the foregoing discussion and description, the invention forming the subject of this patent is a relatively complex network system allowing for communication and control by a number of individual processing modules, conventionally referred to as nodes of the network. These nodes may well comprise personal computer-type units complete in at least some of the cases with display units, keyboards, disk memories of either the rigid or flexible medium type, and modems for remote communications. In other cases they may be simply individual microprocessors with a small amount of software contained in local read-only memory (ROM). The choice for each node's configuration depends on the functions to be performed and the speed with which the operations assigned to the node must be performed. Of course, the overall system must be designed so that cost is as low as possible consistent with reliability and flexibility for the design and expansion of various system sizes and configurations.

The individual functional block diagrams shown in FIGS. 2A and 2B, 3, and 4 and which represent the preferred embodiment of the invention may be implemented of course in hardware, with each individual functional block comprising the electronic logic circuitry necessary to supply the functions specified for the block. However, it is much to be preferred that the implementations be done in individual microprocessor nodes which have software operating in cooperation with the microprocessor and perhaps a limited amount of special purpose hardware. This design approach allows use of cheap off-the-shelf microprocessor units and great flexibility in the design and implementation phases. In such software implementations of course, there is still hardware which performs the individual functions. Indeed, with the microprocessor comprising hardware and the software itself contained in a hardware memory, the entire implementation is in the most basic sense totally hardware. Once a system has been installed, the software is changed only to deal with errors of software (or hardware) design, or to add capabilities not present in the original design.

It should be understood that each function at the time(s) appropriate for its activity typically comprises a part of the microprocessor and a part of the memory in which is stored the associated software, cooperatively functioning together. The individual functional block format is chosen to more clearly display the principles of the invention and to thereby allow someone having ordinary skill in the art to understand and to practice the invention. It is of course possible to describe the invention using a software flow chart, but it is felt that this could obscure important aspects. Since the invention is in fact hardware, it is most appropriate to describe the invention in terms of a representation which emphasizes the hardware rather than the software aspects.

In the diagrams and descriptions for them to follow, it should be understood that there are literally an infinite number of system configurations any of which may comprise a preferred embodiment. Each of these configurations will include one or more of these individual programmable modules and the software more or less permanently resident in them. In some nodes, the structure represented by a single one of the functional block diagrams shown in FIGS. 2A and 2B, 3, or 4 may comprise the entire physical structure of a node. In other cases the structure shown in all of these functional block diagrams may be present in a single node; such a node of course will have substantially greater capabilities than one having only the capabilities of a single one of the functional block diagrams. In the commercial embodiment of this system, all master notes must have the structure of FIGS. 2A and 2B but not necessarily that of FIGS. 3 and 4. Further, it is possible, indeed likely, that in many cases the structure of one or more of these diagrams will be present but inactive in all or many of the master nodes in a system. This is in line with the general philosophy of modularity, flexibility, and reliability of the system's design. Thus, a particular node may perform a particular diagram's functions only if another node on the system is inactive for one reason or another. In this way, the probability that all of the functions of these diagrams will be available at all times is greatly enhanced, although it is possible that they will be carried less frequently or more slowly if the optimal node is not assigned to perform the functions for the structure in any of FIGS. 2A and 2B, 3, or 4.

In an actual embodiment of course, the individual functional block diagram structure does not have such clearly defined independent physical existence as is shown in the FIGS. Indeed, there certainly are individual elements of the physical structure shown which are shared by all or many of the individual elements shown as comprising a module. For example, the hardware elements in each FIG. which store and maintain the various lists and indeed the software itself will almost certainly comprise a single computer memory module which therefore becomes a part of each of these list elements and therefore their corresponding nodes. As another example, the microprocessor elements forming the command interpreter for the software instructions again must comprise a part of each functional block for that individual module. The invention is shown in this form to emphasize that the invention is not merely software, but is the unified physical structure of the physical hardware modules and the individual structural elements from which they are constructed, including the software itself and the physical structure in which the software is embedded within each module.

Another explanation which may make it easier for the reader to understand this invention involves the way in which lists, also known as tables or arrays, are stored in the hardware of this invention. When performing activities relating to nodes, similar types of status messages, or other subject matter where there are several items which have approximately sequential numeric identifiers, it is convenient to retain the information in such lists or tables in a way allowing the numeric identifiers to address or access the related information. This is entirely conventional. When the invention is implemented in a conventional microprocessor or personal computer, it is most convenient to use a portion of the associated memory to store these lists or tables. However, for ease of understanding these lists or tables will usually be shown as separate elements or components of the embodiment. The effect of this is that the element which stores the list or table will become somewhat indistinguishable from the list or table itself. This will not be a problem typically since the element storing the list has that as its only function, but the reader should be aware of this somewhat technical distinction. A similar concept is true for flip-flops which store flags and registers which store counters or values.

It is useful to discuss the meaning of certain symbol conventions used in FIGS. 2A, 2B, 3, and 4. The symbol => on logic diagrams conventionally means "implies", so that for example in connection with timer element 72 in FIG. 2A, 1==>=0 means that element 72 places a Boolean 1 signal on path 73 when the current timer value received from timer array 67 is zero. There are also many situations where a particular signal or message is the combination of several components. Again turning to FIG. 2A, one output of processing element 61 is carried on path 64 and comprises a type code and a node address. Path 64 is shown splitting into two separate paths with path 64a carrying the type code and path 64b carrying the node address. Below this splitting of path 64, the type code and node address are shown merging to re-form path 64. The curved portion of a path symbolizes such splitting or merging.

SYSTEM ARCHITECTURE

Each node or module is connected in the preferred embodiment to every other node by a twisted pair data bus 20 common to every other node as shown in FIG. 1. The system of the invention is intended to be easily expanded or contracted by simply attaching or detaching modules to or from the data bus 20. The system includes functions which detect such changes in the system and reconfigures the system processing activities to accommodate the changes.

A system built according to this invention includes three distinct classes of node structure: a single coordination master node, one or more data provider nodes, and one or more alarm master nodes. It's possible that any particular master node in a system may include none, one or more, or all of the functions of each of these classes of nodes. However, in the commercial embodiment every master node contains software implementing the functions of FIGS. 2A and 2B. As mentioned above, at any given moment the function of a particular class may be resident in a node but inactive for any of a number of reasons.

This invention is intended to form one feature of a much more complex system. Other features of this system are the subjects of U.S. patent applications having Ser. Nos. 07/303,416; 07/303,417; and 07/303,427, having respectively titles Detector for Colliding Signals in Asynchronous Communication, Message Generating Communication Apparatus Having a Message Preamble Format Allowing Parts of Certain Messages to be Ignored, and Token Passing Comminication Network Including a Node Which Maintains and Transmits a List Specifying the Order in Which the Token is Passed, each of which were filed on Jan. 30, 1989 with John Aggers and Roger Roth as inventors. These three applications are hereby incorporated by reference into this description.

Turning first to FIG. 1, the previously mentioned data bus 20 is formed of a simple twisted pair of conductors which can be easily and cheaply strung around the building or other location in which the system and the equipment which it controls is installed. The twisted pair design is used to increase noise immunity as is well known to those familiar with data transmission systems. Further, twisted pair data bus design allows individual nodes to be physically added to and removed from the network by simply attaching or disconnecting two connections between the node and the bus 20. Of course, each node must have its own power source.

There are a number of modules or nodes attached to the data bus 20, of which master nodes 11-14 and slave nodes 15 and 16 are representative. In an actual system there might be many times more of each of these types of nodes than is shown in FIG. 1. As discussed earlier, these nodes may have a wide range of complexity and capability. Each node, master or slave, has a unique network address by which the node is uniquely identified. The address allows messages to be directed to a particular node and by placing its address in the messages it transmits, a node identifies itself as the source of these messages. By convention, no node has the address of zero, and this value is reserved for use in special functions to be explained later.

In the twisted pair data bus design contemplated here, there is only a single communication channel. Accordingly, it is necessary that the nodes time share communication on the bus 20. An elaborate protocol has been developed which controls allocation of the opportunity to transmit messages on the data bus by the nodes. Various aspects of this protocol form the subject matter of the three patent applications identified above and incorporated by reference into this application. Briefly, each node can transmit messages when a token message has been transmitted to it or when responding (with an acknowledge message) to another node which has transmitted a message directed to it. Master nodes are those which can initiate communications with other nodes, i.e. receive and transmit token messages. Slave nodes can only respond to messages provided by master nodes and do not receive and transmit token messages. It is conventional to refer to a master node which is not active, i.e. which has not received and accepted a token message as a slave node, or in its slave mode, but this is confusing so the practice will be to refer to master nodes as either active, if they have the token and can initiate messages, or inactive otherwise.

As is well known, microprocessors operate on data in parallel bytes, and output from them is in byte format. It is necessary to convert the parallel bytes to serial data suitable for transmission on twisted pair data bus 20 and then back to parallel at the receiving node(s). This is accomplished by incorporating a communication interface 50 within each node, see FIG. 2A, 2B, 3, and 4. An interface 50 employing the RS-485 protocol is preferred. The pending application Ser. No. 07/303,416 includes more detail of this interface although the instant invention is independent of the interface specifics. As used in FIGS. 2A, 2B, 3, and 4, the interface 50 is assumed to include additional functions including outgoing message queueing and incoming message interpretation. It should be noted that interface 50 can assemble a number of messages while its node is inactive and then transmit all or some of these messages when the node receives the token and becomes active, or in the case of a slave node, when a response is solicited by a master node. It will be assumed that the mere presence of an enable signal on a signal path dedicated to a message type is sufficient to cause interface 50 to place the message formed of the elements on the multibit input paths dedicated to the components of the message in its outgoing message queue. Further, when messages are received by the interface from the data bus 20, they are provided on specified output data paths to the particular functional blocks which make use of the information in them.

The communication interface 50 shown in each of the FIGS. 2A, 2B, 3, and 4 can in theory be identical regardless of the node element function with which it is included. However, in commercial systems, capabilities vary among the various types of nodes in which a communication interface 50 is located. Those nodes of lesser capability are typically given communication interfaces having less capability as well.

The functions of each interface 50 further include interpreting the various messages carried by the data bus 20, determining which are intended for the node of which the interface 50 is a part, and separating and routing the various messages to the particular elements of the node which are to process them.

Lastly, it should be realized that on occasion, this invention requires or allows the portion of the node structure shown in one of FIG. 2A, 2B, 3, or 4 to communicate with a portion of the node structure in another of these FIGS. It is easy to accomplish this if the classes of communicating node structures are contained in different nodes. However, this is not always the case by any means, and interface 50 is defined to have the capability to route such messages directed from one of these portions of the node structure within a particular node to another portion of the node structure within the node as though the message was actually carried on data bus 20. This may be accomplished by the transmitter element of the communication interface 50 physically placing the message on the data bus 20 and then receiving it with the receiver, or if the receiver and transmitter are not full duplex as is the case for the RS-485 communication protocol, by simply internally passing it from the transmitting to the receiving portions of the interface. In such a case, the message must usually also be transmitted on data bus 20, since many of these messages are directed to other nodes on data bus 20 besides the node in which a particular message originates.

The individual nodes communicate with equipment such as the devices 17-19 which are controlled by signals carried on control and data signal paths 40-42 shown connected to nodes 13, 15 and 16 respectively. This equipment may for example be heating, ventilating and air conditioning equipment, with the individual furnaces, air ducts, chillers, etc. under this network's control. The system is intended to allow for expanded functions related to fire and intrusion detection, flooding, lighting, etc., functions for which automated control is frequently desirable in many modern commercial and even residential structures.

As a part of the operation of the system, it is necessary that it receive information as to external conditions. Two different types of signals supply this information to the system. There are first of all sensors for supplying the magnitude of external condition parameters of which sensors 1A, 1B, 1C, 2A, etc. are examples and are indicated as supplying signals on communication paths 21a, 21b, 21c, 22a, etc., all respectively. These sensors may measure external and other conditions or parameters such as air temperature, wind speed, humidity, solar radiation and time. It is inefficient or even perhaps impossible for each of the nodes to have their own sensors for those parameter values which they may need in the course of their activities, and one subject of this invention are system functions which allow one sensor's output to be shared by all of the nodes on the system. Typically, the approach by the system here described is to periodically provide a message on the data bus encoding the value of each of these parameters. The interval between successive transmissions of a particular parameter value may be under operator or installer control and may vary dramatically from one to another parameter. For example, outside temperature may be supplied once every few minutes while it may be desirable to supply heating or cooling duct air temperature every few seconds.

There are also other conditions, typically within the equipment being controlled or within the building or surroundings in which the system is located, which may require operator intervention and which normally need not be communicated to other nodes. For example, in large structures, it is extremely difficult for a watchman to inspect at short intervals all of the sites within the structure or environs where a condition may arise requiring operator intervention, and then deal with it. In large buildings it could take literally days for a single watchman to visit each area where a problem could occur, yet great harm may occur if for example a pipe has burst or a furnace has ceased to operate in such an area. Using a sufficient number of people to inspect these areas is extremely expensive. Furthermore, one is never confident that these inspections are being performed properly and as scheduled. It is thus cost effective and in fact more reliable to use individual sensors to detect conditions requiring operator intervention in these areas requiring monitoring. But to lead a large number of signal wires from sensors to a monitoring location is inconvenient and expensive, particularly in modular interiors of buildings where the interior structure is frequently altered. It is preferable to gather all such sensed conditions on a common bus at predetermined locations and then display them where an operator is stationed. Since these alarm conditions are relatively rare, it is usually necessary to use only one or two people for such monitoring, so that the occasional event can be sensed by the on-site sensor and reported to the operator who then can deal personally with the problem in whatever fashion is appropriate.

Thus a second type of status message which this system is designed to handle are alarm messages. On the system level, one fundamental difference of alarm from data messages is that there is no scheduled reporting of these messages. A second is that data messages are intended to be used by other nodes on the system. Thirdly, alarm messages usually are communicated to a human operator and frequently indicate some necessity of human intervention.

Certain of the nodes on the network have these alarm sensors connected to them which monitor various physical conditions. Whenever one of these physical conditions varies from a preset form indicating a fault, danger or other event of some kind, the sensor signal prompts the node receiving the signal to record an alarm condition. These alarm sensors may be connected to either master or slave nodes, note FIG. 1 and the various alarm inputs to both slave and master nodes. In general, alarm conditions must be communicated to the system's operator for human consideration or intervention. However, most slave and master nodes to which are connected alarm sensors are usually mounted on equipment in which the alarms are being sensed and may not be the most convenient for communicating to the system operator. To accommodate these requirements, we prefer that certain of the nodes be designated alarm masters and have the ability to communicate with the operator. It is advantageous for there to be in each system at least two master nodes which can function as an alarm master so as to increase the likelihood of at least one alarm master to be operating at all times. It is preferred that there always be an alarm master operational because it may be important that some alarms be brought to the operator's attention relatively promptly. When there are thus two or more masters each of which may serve as an alarm master, it is important to be able to select which of them should function as the alarm master since frequently one of these nodes is a more convenient alarm annunciator for the user than is another.

The approach taken in this invention to resolve this potential uncertainty is for each master node having alarm master capability to have an installer or operator-provided priority relative to the other potential alarm master candidates. The priority is established on an alarm class by alarm class basis, so that, for example, one alarm master may take precedence over all others with regard to HVAC-related alarms, another for fire alarms, a third for intrusion detection, etc. The system is designed so that when one such master is unavailable, another can take its place without the necessity for operator intervention. It may be preferred for example, that the building maintenance staff have an alarm master located most conveniently for them, and then this master would have the highest priority for HVAC-related alarms. Similarly, the master node located at a guard desk might be given the intrusion and fire detection-related alarms. If each guard desk has an alarm master, then there might be one which is preferred for each category. On occasion a particular alarm master will become unavailable for reasons such as malfunctions or where guard desks are unmanned at night and the alarm masters at those desks turned off. It is convenient for these situations to be detected relatively promptly by the system and the alarm master responsibilities for that inoperative node transferred to another master. It is of course an inconvenience for the person at the node still operating to receive alarms not meant for his or her station, but in general one expects alarms to occur relatively infrequently, and it is preferable to at least have the option of ignoring an alarm message than to have no opportunity at all to see it. The system is designed so that alarm master responsibility is automatically transferred to still active masters having alarm gathering capability when masters previously having the gathering capability when masters previously having the responsibility are no longer in operation.

The system of FIG. 1 is shown as having a number of alarm sources, alarm 1, alarm 2, etc., which are connected to data paths 30, 31, etc. respectively. In some cases these may be freestanding sensors, as with alarm 1, alarm 2, etc. In other cases these alarm sensors may be like alarm 7, alarm 8, and alarm 9, which are within controlled equipment such as device 19, from which they can report dangerous or out of limits performance. Each of the alarms are connected by the data paths 30–38 to one of the nodes 11–16. The system is designed to have various of the nodes 11–16 receive the alarm signals directly from the sensors. Not every node may necessarily receive alarm signals, and of course, particular nodes may have many alarm inputs, witness slave node 16.

In the preferred system, individual alarms are reported by the sensing node to a particular node designated an alarm master. Alarm masters have the capability of annunciating alarms to the system's operator. In FIG. 1, nodes 12 and 14 are alarm masters. Alarms are categorized as belonging to one of several classes, say HVAC, fire, security and intrusion, flood, etc. Each class may have its own alarm master although a single master may handle all classes of alarms. Alarm masters must be master nodes. Typically, alarms received on a data path 30–38 are not immediately reported to the alarm master by the node connected to the sensor involved, but await the event of the alarm master for the class of the alarm involved entering its active mode to then prompt nodes having received alarms of the class involved to transmit them to the alarm master.

It is usually preferable, both with data sources and alarm masters, that for every data item there always be a node having responsibility for supplying a data message for it and even more so, there always be a node serving as the master for each alarm class. For example, it is postulated that as this system receives increasing commercial use, there will be instances where the current alarm master for a particular class of alarms will become unavailable for one reason or another. This system provides for promptly placing such newly absent node's alarm master responsibility in another node having the capability to serve as that class's alarm master. Thus if at given instant node 12 is serving as the alarm master for HVAC alarms and it loses power, then this condition will be detected and node 14 will be designated instead as the HVAC alarm master.

COORDINATION MASTER NODE

Overall control of the status message generating and handling responsibility is carried by one master node which is selected by some unambiguous criterion. This master node is designated as the coordination master. FIGS. 2A and 2B reveal the details of the coordination master. As explained in the aforementioned U.S. patent application Ser. No. 07/303,427, every node of a system on an individual data bus 20 has a unique node address stored in a node address register. This value can only be changed by the operator of the system. A simple and unambiguous means of selecting a node as the coordination master is that the node having the lowest numbered address serve as the coordination master. It should be reiterated that several of the master nodes 11–14 (FIG. 1) may have the functional elements shown in FIGS. 2A and 2B, but that these elements will be active only while the node is serving as the coordination master.

In FIG. 2A, communication interface 50 is shown as providing various types of messages for use by the coordination master. Each message has a code field identifying it as of one or another of the allowable types of messages. Content of the various types of messages is shown in the format diagrams of FIGS. 5A and 5B. The code field which identifies the type of message is shown as the left-most segment of each diagram. The messages shown as inputs from the data bus 20 and outputs from the communication interface 50 are the first active master list entry on data path 52 from the active master list message, the data messages on path 53, and the status request and acknowledge messages on path 54.

The data messages on path 53, which contain the actual sensed values of the data items broadcast on the data bus, are monitored by the coordinator master node to determine that the designated node is actually supplying a particular data item. Of course, it is also possible that the node can use the data item values in the data messages. A status request message on path 54 results from another node propagating a signal in essence proposing that this other node function either as the source node for a designated data item or as an alarm master for a designated class of alarms.

In FIG. 2A the master node serving as the coordination master is shown as including a node address register 51 in which is stored the node's unique node address. As explained in the '427 application, the active master list message, which is shown diagrammatically in FIG. 5A, is broadcast on occasion on the data bus 20 by a node designated the communication master. The active master list message is supplied by the communication interface 50 on data path 52. As further explained in the '427 application, the active master list message contains the addresses of active master nodes in the order in which the token is passed from one master node to another, active in this context only referring to their being currently scheduled to receive the token. It is prescribed for this system that the token is passed in increasing numeric node address magnitude with the node with the largest address passing the token back to the active node with the address which is smallest in magnitude. Therefore, the first node address in the active master list message is the lowest numbered master node, and the node which is designated to be the coordination master.

A compare element 55 receives the node address from the node address register 51 and the active master list on path 52 from the communication interface. Element 55 compares the first node address in the active master list with the contents of the node address register 51 and if equal provides a Boolean 1 signal to the S or set input of flip-flop 60, and if not equal a Boolean 1 signal to the C or clear input of flip-flop 60. The output of the 1 side of flip-flop 60 is provided on path 84 and serves as an enable signal. While the enable signal is a Boolean 1 the node will function as a coordination master. While the enable signal on path 84 is a Boolean 0 the node is disabled from acting as a coordination master. As an aside, it will be the practice here to use reference numbers consistently from one to another of the FIGS., since the concept is that each of these individual nodes have similar structures, and may well function as more than one of communication master, data provider, and alarm master nodes either simultaneously or over time.

Compare element 55 and the flip-flop 60 as shown in FIG. 2A are representative of the discussion above concerning the use of a functional block diagram to represent what in the preferred embodiment is implemented in software. That is, compare element 55 and flip-flop 60, although shown as discrete hardware elements, are in the preferred embodiment implemented as software which cause discrete circuit elements in a microprocessor to temporarily function as the hardware elements shown. Thus, compare element 55 may comprise a few memory locations in the microprocessor's ROM storing instructions which test the equality of the contents of two RAM memory locations storing the node address register and the first entry in the active master list, and then select the address of the next instruction to be performed depending on the results of that test. Similarly, flip-flop 60 will comprise a single byte or even bit within the RAM of the microprocessor which is set to 1 or 0 or some other pair of different numeric values depending on the next instruction to be executed as a result of the compare function of element 55. This discussion is intended to further explain the close relationship between so-called hardware and software implementations, and no further note will be taken of it in the following description of the invention.

The enable signal from flip-flop 60 is applied to the previously mentioned request decoder 56 which receives on path 54 from the communication interface 50 all of the status message requests placed by the other nodes on data bus 20. Responsive to the enable signal from flip-flop 60 having a Boolean 1 value, the request decoder 56 gates each data request signal from path 54 to path 58 and each alarm request signal from path 54 to path 57. The data requests are processed by elements corresponding to the remainder of the diagram of FIG. 2A. The alarm requests are processed by elements corresponding to the diagram of FIG. 2B. The enable signal from flip-flop 60 may also be used to activate (and deactivate) other portions of the node as necessary to accomplish the specific purposes of processing alarm and data requests without causing interference with other functions of the node. Note that in a software implementation this separation and interference avoidance can be easily done by simply having separate and self-contained sections of processor instructions which cause the processor to perform these functions.

DATA REQUEST PROCESSING

Dealing first with the data request messages, note that the functional format of the data request messages transmitted by nodes attempting to sign up to furnish data items on the system is shown in FIG. 5A. Individual nodes which have the appropriate sensors attached to measure particular data items will on occasion issue data request messages indicating their availability to supply on the data bus 20 data messages encoding the value of the data item having the type code contained in the data request message. Each data request message supplied on data bus 20 and gated onto path 54 by communication interface 50 includes a data request code field, a source node address, and a data type code. The data request code field contents may have any convenient preset numeric value which identifies the message as being a data request. The source node address is the address of the node issuing the data request message and requesting assignment as the source for the data item having the data type code. The data type code specifies the type of data item for which the request is being made. The type code may be assigned to each type of data item during system design.

The data message components include a data message code field, a source node address field, a data type code field, and the data itself. The data message code may have any convenient numeric value. The source node address and the data type code are as defined for the data request message. The data may be presented to the potential user nodes in any convenient format set by the system installer or designer as desired.

Request decoder 56 includes the source node address within the data request message in the data request signal on path 58. The request decoder also supplies the data type code within the data request message as part of path 58's data request signals.

These data request messages are supplied to data request processing element 61 representing the elements of the coordination master node which generate the response to the requesting node, that is the node which generated the data request message. To determine whether the data request should be accepted or rejected, it is necessary for element 61 to inspect a global data master (GDM) list maintained by an element 65. The GDM list element 65 maintains a table of information specifying for each individual data item whether a node is functioning as a source for that data item and if so, the node address of the node functioning as that source. The preferred way to organize such a table is to use the unique data type code which identifies each individual data item to specify the position in the table where the information pertaining to that data item is stored. The significant information stored in the global data master list for purposes of this invention is the source node address, that is the node address of the node assigned to provide the data message having the data type code for the entry involved. This organization will be assumed to exist for the GDM list stored by element 65. Thus at a particular instant in the coordination master of an operating system constructed according to this invention, entry number 5 for example in the global data master list may contain the value 10. This means that the data item assigned data type code 5 is currently scheduled to be provided by the node having 10 in its node address register 51. In case there is no node assigned to supply the data message for that data type code, a preselected value of the source node address functions as an "unassigned flag" to indicate this condition. It is convenient to use a value of 0 for this flag, and further discussion assumes that a source node address of 0 in any entry of the global data master list implies that no node is assigned to provide the data item having the data type code which indexes that entry. Obviously, the choice of the value for this flag, or even use of a separate dedicated field in the GDM list to indicate that a source node has been assigned to a particular data item, is strictly a matter of design choice.

Element 65 makes the GDM list available on path 66 to data request processing element 61 which tests the entry in the GDM list indexed by the data type code encoded in the data request signal on path 58 and provides the result of that test as an accept/reject (ACC/REJ) flag on path 63. If the value for the data type code in the data request signal indexes a source node entry in the global data master list whose value is *unequal* to Boolean 0, this means a node is already serving as the source for the data item having that data type code and the request should be rejected. In that case, element 61 sets the signal on path 63 to a predetermined value, say Boolean 0, for a period of time to indicate that the request has been rejected.

If on the other hand, the processing element 61 senses the source node entry in the GDM list indexed by the data type code equals 0, then the signal on path 63 is set to encode a Boolean 1 for a period of time. This means that the node which originated the data request message can be assigned the responsibility of supplying the data item having the data type code in the data request message to other nodes on the network. This new assignment is reflected in the GDM list by the data request processing element 61 transmitting to the GDM list element 65 on path 64 the node address and the data type code in the data request signal on path 58. The GDM list element 65 stores the node address on path 64 in the GDM list entry indexed by the data type code carried by path 64.

It is also preferred to immediately signal the node which generated the data request message on data bus 20 that its request has been accepted. This information is incorporated in the data request acknowledge message. The functional format of the data request acknowledge message is shown in FIG. 5A as having these components: a data request acknowledge code field identifying it as of this type of message, a destination node address field which specifies the address of the node which generated the data request message to which this acknowledge message is in response, a data type code field which is identical to that in the data request message, and a data acknowledge flag field which specifies whether or not the request was accepted. Note that the overall protocol of this system requires an acknowledge message in general in response to each message, including a status request message, directed to a particular node. Informing the requesting node in the acknowledge message that its request to transmit data messages for a particular data item has been accepted allows it to immediately begin transmitting the data message involved.

As mentioned above, the communication interface 50 generates messages to be placed on data bus 20 in response to a specific enable signal produced within the node for the particular message type involved. Each message has a number of numeric components carried in fields which are transmitted to the communication interface 50 on a predetermined data path dedicated to that type of message. Thus, the data request acknowledge message components carried on path 80 comprise the node address from the data request signal and supplied on path 58 and the ACC/REJ flag supplied on path 63, with the enable signal on path 62. The diagram is meant to indicate that these individual data paths merge to form data path 80. It should be understood that while there are likely to be parallel transmissions of data on at least some of these paths, there may also be a serial transmission of bits or bytes on one or more of the individual paths carrying the message components which together form the complete message itself. The format of these components may vary from one to another of the message paths within the nodes, with the communication interface 50 designed to accommodate each of the messages. Note that these considerations are well known to those familiar with communication and computation apparatus and no particular detailed discussion is deemed necessary to enable construction of this invention.

For the data request acknowledge signal enable, the data request processing element 61 provides a ready signal comprising a momentary Boolean 1 on path 79 to one-shot 78, which generates an enable signal on path 62. Communication interface 50 is prompted by the enable signal from one-shot 78 on the path 62 part of path 80 to accept the data request acknowledge message components on path 80 into its queue for transmission on data bus 20. One-shot 78 may be designed to provide the enable signal for so long as is necessary to cause communication interface 50 to accept all of the acknowledge message components provided serially on path 80. Alternatively, interface 80 may have the internal capability to manage the acceptance of these message components, selected according to the message for which the enable transmit signal is provided.

When a data request message is received, in addition to immediately informing the node which has requested data message responsibility for the data type whether the request has been granted, it is also preferred that the entire GDM list be broadcast to all the nodes on the data bus 20. The ready signal on path 79 is supplied to one input of OR gate 82, which provides a Boolean 1 at its output on path 84 which serves as the enable signal for the GDM list broadcast signal. A signal on path 66 from element 65 encoding the entire contents of the GDM list along with the enable signal on path 84 forms the GDM list broadcast signal on path 75. Communication interface 50 receives the GDM list broadcast signal and responsive to the enable component of it, transmits in broadcast mode on data bus 20 the entire GDM list. When a message such as the GDML broadcast message is transmitted, the system protocol requires no acknowledgement of the signal by any node. The general functional format of the GDM list broadcast signal is shown in FIG. 5A. The node address in the first entry is the address of the node which furnishes the data item having a data type code of 1, that in the second entry is the node address for the data item with a data type code of 2, etc. As will be explained in connection with FIG. 3, each time the GDM list broadcast message is transmitted, the various nodes store the GDM list directly within their RAM, and from this locally stored list determine their responsibility for supplying data messages.

The data messages carried on path 53 encode the actual values of the data items whose data type codes are present in the data type code fields of these messages, see the format for the data message shown in FIG. 5A. It is required that each message for each data item be broadcast within a predetermined time interval for that data item type following the previous broadcast of the message. If the node to which a particular data item's broadcast is assigned fails to accomplish the broadcast within that predetermined interval, then the assignment is revoked by removing the node's address from the GDM list entry for that data item type. This could for example result from a power failure for the assigned node or from a hardware malfunction within the node. To assist in detecting this condition, there is provided a timer table element 67 which stores a data item timer table having an entry for each data item type. The juxtaposition in FIG. 2A showing timer element 67 adjacent to GDM list element 65 is to indicate that the data item timer table is organized like the GDM list, with the data type code for a data item forming an index to the timer table entry associated with the data item. Each timer table entry has two components or fields as can be seen in the data item timer table shown in FIG. 6. The maximum interval field in each timer table entry is set by the system operator, and specifies the maximum time interval between successive broadcasts to the nodes on data bus 20 of a data message encoding the data item having the type code forming the index to the timer table entry. The maximum interval field is typically of fixed value and will rarely be changed by the operator. The time units for the maximum interval field are arbitrary, but typically the internal clocks of microprocessors run in seconds or decimal fractions of seconds, so it is convenient to specify the maximum interval field in seconds. The current time field in each entry is a variable field which is initially set to the value in the maximum interval field. These timers serve as activity indexes for the nodes having responsibility for the data items whose type codes index them. If there is insufficient activity of a node as measured by the time interval which has elapsed since the previous transmission of a particular data item, then the coordination master will seek to reassign the responsibility of transmitting the data message for that type code to another node.

Each time data request processing element 61 accepts a data request from a node, a part of the activity in response is to set in timer element 67 the current time field indexed by the data type code to its associated maximum interval field. This is symbolized by the reset timer element 89 shown which, responsive to the data type code supplied to it on path 64 by element 61, receives the contents of the maximum interval field in the timer table of timer element 67 specified by this data type code and gates this value to the current time interval field in the timer table entry specified by this same data type code.

Each data message carried on path 53 also causes reset timer element 89 to reset the current time interval field in the timer table entry indexed by the data message's data type code, to the associated maximum interval. The data type code on path 53a provided by the transmission of a data message on data bus 20, forms an input to reset timer element 89. This type code is used as an index to the timer table to extract the maximum interval field contents used for updating the current time field in the same way that it is updated when first accepting a data request.

At scheduled intervals the microprocessor timer test and update element 71 of the node receives the contents of all of the current time fields in the timer table and tests to see if any are equal to 0. The index to each of these timer table entry current time fields whose contents are equal to 0 is the data type code for a data item which has not had a data message transmitted for it within the scheduled time interval as defined by the contents of the maximum interval field for that data type. This data type code is placed on path 70 for use by element 76. Element 76 places the data type code from path 70 on path 77 and causing element 61 to clear the GDM list entry specified by the data type code on path 70. As a result of this activity there is no longer any node assigned to transmit the data item having the data type code. This is not a great loss however, because the fact that there has been no transmission of the data message for at least the time specified by the contents of the maximum interval field strongly implies that the node previously assigned will not supply the data message involved until the operator intervenes. It is also possible to provide an alarm signal to indicate the occurrence of this event to the operator. In the meantime, of course, it is necessary for the system to continue its operation using whatever alternatives to this data item value are available.

When such a comparison failure occurs it is necessary to broadcast the GDM list to all of the nodes on data bus 20 to prompt other nodes to transmit a data request message for the type code involved. Therefore the update/test timer element 71 also provides a Boolean 1 as an error signal to OR gate 82. This signal functions in exactly the same way as does the ready signal to OR gate 82 on path 79 from processing element 61. The Boolean 1 output from OR gate 82 provides the enable signal on path 84 which specifies that the GDM list message is to be broadcast. The GDM list itself is present on path 66, which is shown as merging with path 84 to symbolize the formation of the message.

There is also another possible error which may occur for any of several reasons. This is the case where other than the assigned node broadcasts the data message for a data item. To detect this condition data message monitor element 72 receives the contents of each data message's source node field component on path 53b. The data message's type code on path 53a is provided as an index to the GDM list element 65 causing the entry in the GDM list assigned to that data item to be supplied on path 66 to data message monitor element 72. If the source node address from the data message on path 53b is unequal to the source node address from the GDM list on path 66 this indicates that the data item having the data type code in the current data message is being supplied by a node other than the one to which the responsibility has been assigned. It is usually not easy to tell what the reason is for this error, but it is well for the operator to investigate. Accordingly, a part of the response is to provide an alarm indication to the node which handles errors of this type, and this is shown as one output from monitor element 72. It is also possible that a "soft" error has occurred which retransmitting the GDM list broadcast message may fix. Accordingly, a third input to OR gate 82 is from monitor element 72, by which, as explained above, the communication interface 50 is signalled to broadcast the GDM list message. Frequently, broadcasting of the GDM list message serves as a termination message for causing the node which is improperly transmitting data messages to cease the improper data message transmissions.

There is also a fourth situation where it is necessary to transmit the GDM list broadcast message. It is possible for a system operator to "deselect" a particular node from supplying any or all of the data messages. This might arise as to a single data message if the sensor which supplies the value is removed from the node. Or if the node itself is to be removed from the system, then it is frequently convenient to use a preset operation to extinguish the node's responsibility for providing data messages. As will be explained in connection with FIG. 3, a node relinquishes data message responsibility for data having a particular type code by transmitting a data request message with a node address of zero. The coordination master node replaces with zero the current node address for the type code in the GDM list stored by element 65. By convention, a node address of zero in the GDM list indicates to all nodes that no node is providing the data message having the type code involved. Upon receiving a GDM list with a zero node address for a type code, nodes in the system will generate data request messages in an attempt to gain responsibility for transmitting data messages for that data type. To prompt when necessary such a further data request message for that data type from another node, test element 68 receives on path 64b from processing element 61 the node address from each data request message and if the node address equals zero, provides a Boolean 1 signal on path 69. This Boolean 1 signal satisfies OR gate 82 and causes an enable for a GDM list broadcast message to be issued on path 84. Any node receiving the GDM list broadcast message and capable of supplying the data message for the type involved can then respond with its own data request message which can be processed in the fashion described above.

It can be seen that the apparatus described in the preceding paragraphs allows assigning responsibility for transmitting individual data items' data messages, informing the nodes receiving such assignments, and detecting and replacing inactive nodes to which such assignments have been made.

ALARM MASTER REQUEST PROCESSING

As mentioned above, the alarm master processing function of the coordination master establishes the responsibility among the various master nodes for handling alarms of each particular class. Recall that alarm master nodes do not themselves generate alarm messages by virtue of their designation as an alarm master. The alarm master designation simply means that the node can function to receive or gather alarm messages from nodes which generate them. Recall too that all alarms belong to one of several classes, and alarm masters take responsibility for processing individual alarms for only entire classes. It should be noted that there are a number of similarities between data request and alarm request processing functions. The alarm request processing functional elements shown in FIG. 2B are always a part of the same node, the coordination master node, which processes the data request messages. There are also lists pertaining to the alarm functions which are maintained in the coordination master node and in the master nodes which are a part of the system, and messages sent and processed to accomplish the various alarm functions, which are analogous to various lists and messages pertaining to providing data items.

Alarm request processing element 100 receives the alarm request messages on path 57 from the request decoder 56 shown on FIG. 2A. Alarm request messages have the functional format shown in FIG. 5A and are transmitted by one of the typically several nodes which has the capability of processing the particular class of alarm messages designated in the alarm class code in the alarm request message involved.

As shown in FIG. 5A, the source node address field in the alarm request messages on path 57 contains the address of the node which originated the alarm request message. The alarm class code field contents identify the class of alarms for which the node is requesting to act as master. The node alarm priority field contains a numeric priority value specifying the priority of the requesting node to function as the alarm master for that alarm class. An alarm request message supplied on data bus 20 is interpreted by the communication interface 50 and the request decoder 56 (FIG. 2A) and gated by decoder 56 onto path 57. Presence of the alarm request message on path 57 prompts the alarm request processing element 100 to execute its functions. To understand how element 100 performs these functions, it is also necessary to understand how the tables maintained by the alarm class assignment list element 104 and the related alarm class priority list element 105 and the token counter list element 106 are organized. The organization is actually very similar to that of the global data master list. Each alarm class has a numeric code uniquely identifying that class and which can be used as an index to the lists for retrieving entries associated with that alarm class. Thus alarm class 1 has its related parameters stored in the first entry of each table, alarm class 2 has its parameters in the second entry, etc. The alarm class assignment list element 104 stores the addresses of the nodes currently responsible for each alarm class in the entry indexed by the alarm class's code. Similarly, the alarm class list priority element 105 stores in each alarm class priority list entry the priority as to the alarm class involved of the node whose address is stored in the corresponding alarm class assignment (ACA) list entry. The token counter list element 106 stores a variable token count value for each alarm class. The calculations involved in updating each value will be explained in conjunction with the discussion of the alarm token update element 107.

The operation of alarm request processing element 100 starts in response to a alarm request signal on path 57. Initially, element 100 transmits the alarm class code on path 116 to alarm class priority element 105 which causes element 105 to place on path 111 the priority of the current master node having responsibility for that class of alarm. Processing element 100 receives this priority value and compares it with the priority in the node alarm priority field in the alarm request signal on path 57. Processing element 100 then places on path 101 an accept/reject (ACC/REJ) signal having either a Boolean value indicating that the priority of the node which originates the alarm request message for the alarm class is higher than, or a different Boolean value indicating that the priority is lower than or equal to, the priority value already in the ACA list for the alarm class involved. The former condition, that the alarm request message's priority is higher than that in the ACA list for the alarm class code, means that the alarm request will be accepted. The latter condition means that the request will be rejected. These two values on path 101 will accordingly be referred to respectively as the alarm request accept and reject, or simply, accept and reject values.

It is necessary to communicate acceptance or rejection of the alarm request message to the requesting node, and this is done in an alarm request acknowledge message, a message very similar to the data request acknowledge message. The individual fields are defined similarly in these two acknowledge messages taking into account of course the differences in the request messages to which they respond. To generate the alarm request acknowledge message, the alarm class code from path 116, the ACC/REJ signal (whose Boolean value indicates whether the request has been accepted or rejected) from path 101, the new alarm master node address from processing element 100 on path 102 which becomes the destination node address for the alarm request acknowledge message, and an enable code signal on path 127 are all combined to form path 128, from which the communication interface 50 generates the alarm request acknowledge message on data bus 20. The enable signal on path 127 is the actual signal to the communication interface 50 which prompts it to issue the alarm request acknowledge message. If the alarm request message has been rejected, i.e. the ACC/REJ signal has a Boolean 0 value, the alarm request acknowledge message concludes the essential activity of the alarm master in response to the alarm request. It is also convenient to provide an alarm message indicating that the alarm request message was rejected. Since the node which issued the original alarm request message had already theoretically tested the priority and determined that it (the requesting node) did in fact have higher priority than the currently serving node for the alarm class, rejecting an alarm request indicates at the very least the possibility of a malfunction in the system. The ACA list is again broadcast to ensure that all notes have the correct ACA list.

There are two conditions which results in the alarm request message being accepted. The first is that the alarm request signal priority value indicates higher priority than is currently present in the alarm class assignment list for that class. The second is that no node is currently assigned alarm master responsibility for the alarm class having the code in the alarm request message. It is possible to indicate that no node has been assigned responsibility for a particular alarm class by either setting the priority value in the ACA list for that alarm class lower than any value ever actually assigned to a node or by setting to zero in the ACA list the node address of the node serving as the master of the class of alarms involved. When the alarm request is accepted, processing element 100 placing an accept value signal on path 101. An alarm request acknowledge signal on path 128 accepting an alarm request is generated in exactly the same way as explained above for the case of a rejected alarm request.

If the request is accepted, it is necessary to update the ACA list to reflect this condition. The alarm class code on path 116 is transmitted to element 104 to select the ACA list entry for that alarm class and to insert the node address of the requesting node on path 116 in the ACA list entry. The alarm class code is also transmitted to the alarm class priority list processing element 105 to cause the priority value for the new node for the alarm class involved to be inserted into the priority list.

If the alarm request message is accepted, then this preferred embodiment transmits two further messages on data bus 20. Both incorporate the ACA list and the alarm class priority list. They differ in that the ACA list message is directed to the just displaced alarm master and requires an acknowledge response message to make as certain as possible that the just displaced master will no longer function as master for the alarm class specified by the ACC. The ACA list broadcast message is broadcast to every node, or at least a specified group of nodes, without any acknowledge message required so that there is no certainty that every node actually received the new ACA list and priorities. The formats of these two messages are shown in FIG. 5B. In this way the other nodes on data bus 20 are signalled that the alarm master has been changed for the alarm class code involved.

In order to send an ACA list message to the superseded alarm master node, it is necessary to provide the node address of this node which has been superseded as the alarm master for the alarm class, as the destination address for the ACA list message. When the alarm class code is initially presented on path 116 to the ACA list element 104, the current node address specified by the alarm class code is encoded in a signal sent to the current node address register 109 where it is recorded. The output of register 109 is on path 103 and encodes the node address of the current (superseded) alarm master for the alarm class encoded by the signal on path 116.

The ACA list broadcast message and the ACA list message are issued under the control of the OR gate element 120 and the AND gate element 122 respectively. Each of these messages encodes the contents of at least a part of the ACA list stored by element 103. They differ in that the ACA list broadcast message is transmitted in broadcast mode to all or at least a group of nodes, and no acknowledge message response from any of the nodes receiving the ACA list broadcast message is required. The ACA list message is sent to a specific node, and the node to which the ACA list message is sent must respond with an acknowledge message in response to the ACA list message. In this way, the coordination master node can be assured that the replaced alarm master node has conditioned itself to no longer act as alarm master for the alarm class involved.

Turning first to the ACA list broadcast message, there are three different conditions, any of which require it to be transmitted. The ACC/REJ signal on path 101 is applied to one input of OR gate 120. When the ACC/REJ signal has a Boolean 1 value, one of these conditions is satisfied and OR gate 120 provides a Boolean 1 output on path 121 to form the enable signal for the ACA list broadcast message carried on path 125 to prompt communication interface 50 to transmit this message. Secondly, if the node address of the alarm request message is set to 0, the node is requesting that it be deleted for the alarm class involved, and it is preferred that the ACA list broadcast message be sent in this case also. Test element 130 receives the new node address on path 102 and if equal to 0, sets the signal path to OR gate 120 to a Boolean 1. Responsive to this Boolean 1 OR gate 120 provides the enable signal on path 121 which causes the ACA list broadcast message to be sent. The third condition for issuing an ACA list broadcast message arises in connection with the token counter checks which determine whether the currently designated alarm masters are active. These checks are performed by element 112 whose activity will be discussed below.

The ACA list message is sent directly to any node having responsibility for an alarm class and which is replaced by another node. The conditions which identify the need for an ACA list message are that the current node address encoded on path 103 is unequal to 0 and that the alarm request message was accepted. Accordingly, AND gate 122 receives as its two inputs the ACC/REJ flag encoded in the signal on path 101 and the output of test element 124. Test element 124 receives the current node address signal from register 109 and carried on path 103, and provides a Boolean 1 as an input to AND gate 122. Recall that the ACC/REJ flag encoded in the signal on path 101 is a Boolean 1 when an alarm request message is accepted. When both inputs to AND gate 122 are a Boolean 1, AND gate 122 provides a Boolean 1 output on path 123 which serves as the enable signal causing the communication interface 50 to issue an ACA list message, and perform the processing for the acknowledge message required as the response. The contents of the current node address register 109 and carried on path 103 form the destination address of the node to which the ACA list address is directed. The ACA list encoded on path 110 and the priority list on path 111 form the other significant parts of the ACA list message on path 126 as is shown in the functional format for the ACA list message in FIG. 5B.

The interface 50 transmits any ACA list and ACA list broadcast messages received from the coordination master node elements shown in FIG. 2B when the coordination master node is again active. The ACA list message is received and stored within the RAM of the node whose alarm master responsibility was just superseded. The node whose address was supplied as the current node address on path 103 and to whom the ACA list message was directed must then respond with an acknowledge message. The communication interface 50 processes the acknowledge message and senses and issues an alarm message if the acknowledge message is incorrect or is not provided within a preset time.

Since alarm handling techniques may differ from alarm class to alarm class, and in many cases will not occur at regular intervals, it is not always possible to directly determine from alarm message transmissions whether the nodes having responsibility for particular alarm classes are discharging their alarm master responsibilities, as is done for the data messages sent by data masters. Instead, what this design relies on is a procedure to detect whether or not the particular current alarm masters are becoming active, i.e., are acknowledging or sending token messages. If a node designated as an alarm master for a particular alarm class becomes periodically active, then it is very likely that it is able to act as that class's alarm master. It is most convenient to sense whether individual nodes are becoming active by monitoring token message activity and using this activity to update a token counter list maintained by element 106. The token counter list is organized just like the ACA and alarm class priority lists, with the alarm class code serving as an index to the list entry to reference the information pertaining to that alarm class. An alarm master token count reset element 107 receives token messages on path 108 and the ACA list on path 110. Each time a token message is received by element 107 the ACA list is made available on path 110 and searched by element 107, and the address of the node having alarm master responsibility for each alarm class is tested to be equal to the address of the node passing the token. (It is necessary that the address of the node passing the token be used, since there is no guarantee that a node to which a token message is directed, is functioning.) Whenever equality is found, element 107 sets the token counter for that alarm class code to 0.

There is also a token value check/update element 112 which receives a node active signal on path 84. This node active signal is present when the coordination master node of which the apparatus of FIG. 2B forms a part, receives and acknowledges a token message. In response to a node active signal indicating the coordination master node is active, element 112 reads every entry in the token counter list stored by element 106, increments each by 1, and then provides each incremented value on path 119 to the token counter list element 106. Element 112 further tests each such value to be equal to a preselected positive integer, preferably one in the range of three to five. The index value of each entry in the token counter list for which such equality is detected equals an alarm class code having assigned to it an alarm master which apparently has not transmitted a token message for the preselected number of transits of the network by the token. The implication is very strong that such a node is not presently functional and that it is prudent to select another node as the master for the alarm class.

Accordingly, it is necessary to modify the ACA list to show that presently no node is assigned as alarm master to process alarm messages belonging to the alarm class for which this equality between the token counter and the preselected number was detected. This is accomplished by providing the alarm class code for which the equality was detected by element 112, to an element 113 which causes the alarm master entry in the ACA list indexed by the alarm class code on path 115 to be cleared. Signal path 115 symbolizes setting this entry to indicate absence of an alarm master assigned to the alarm class.

Since the ACA list has been modified, it is also necessary to transmit the ACA list and ACA list broadcast messages on the data bus 20. To accomplish this, element 112 place a Boolean 1 on path 114. This signal satisfies OR gate 120, and the procedure involving enable element 121 and discussed in connection with the alarm request processing element 100 and the ACC-/REJ signal on path 101 occurs. By this activity the ACA list and ACA list broadcast messages are sent as well. It is also preferable that the signal on path 114 provide an error indication.

As with data request messages, it is also possible for an alarm master to transmit an alarm request message with a source node address of zero. This is conventionally understood in this design to indicate that the current assignment for the ACC in the alarm request message is to be deleted. Processing element 100 inserts the zero value for the node address in the ACA list stored by element 104. A test element 130 receives the new node address on path 102 and tests it to be equal to zero. If it is equal to zero, then element 102 provides a Boolean 1 as an input to OR gate 120 to prompt an ACA list broadcast message in the same fashion that any other change in the ACA list prompts broadcast of the list.

DATA PROVIDER NODES

Every master node to which is attached a data source or sensor may function as a data provider. These data provider nodes perform three major types of functions. The first is to maintain an internal GDM list specifying which data messages are the responsibility of the node. This requires that data provider nodes process the two messages from the coordination master node which cause the GDM list to be altered, these being the GDM list broadcast and the data request acknowledge messages. The second is to form and transmit the actual data messages which provide the parameter's value to the other nodes on a global basis. The third is to transmit the data request messages, each of which one will recall, request the coordination master to grant permission to the node involved to supply a particular parameter's value in data messages or to the node's responsibility for supplying a particular data code type. This third function requires the node to determine the conditions requiring transmission of the data request messages. All of the messages involved with these functions have already been discussed in connection with the coordination master structure involved with data request processing as shown in FIG. 2A.

In FIG. 3, the data provider structure of nodes is shown as having the conventional communication interface 50 for scheduling flow of messages to data bus 20 and for receiving and routing incoming messages. It should be understood that in certain circumstances the coordination master node and the data provider node for a particular data type may be one and the same, with the communication interface 50 routing the messages between the various parts of the single node performing the different functions shown in FIGS. 2A and 3. It should also be realized that while there can only be a single coordination master node at any time, there may be as many active data provider nodes as there are different types of data items, although this would likely be true only for a very large and widely distributed system.

The heart of the data provider node structure is the GDM list stored in list element 147. The contents of the GDM list in element 147 is for most of the time identical to the GDM list maintained by the coordination master in element 65. There are short-lived differences after the coordination master has changed the source for a data item and before the change(s) to the GDM list have been communicated to the network as a whole by a GDM list broadcast message.

While there are a number of satisfactory ways to organize in a data provider node, the GDM list in element 147 and the ancillary tables in elements 146, 148, and 149, they are shown here with structure allowing an index provided on path 144 to designate the entry in any of the tables involved to which access is desired. The data type code functions as this index on path 144 which specifies the list entry in which information provided at an input path 143d, 136c, 140, 132c, 162 or 143b of the list elements 146-149 is stored. The index on path 144 also specifies the list entry from which information stored in each list element 146-149 is encoded on the respective output data path 156, 137, 150, or 151. The index on path 144 is provided by the index cycle/select element 142, which has a number of different sources from which the index needed is generated depending on the particular function to be performed at the time.

The actual sensor values encoded in the data messages are provided on input channels of a multiplexer 157. Multiplexer 157 itself may comprise a number of input channels to each microprocessor which is functioning as a data provider node. These input channels have individual addresses any of which may be encoded in a signal carried on the input channel select path 156 when the multiplexer 157 is operating. Multiplexer 157 connects the input channel specified by the input select signal to the output data path 133, allowing data to flow from the data source connected to the input channel, to the output path. It should be understood that the input data may be encoded in analog form in which case the multiplexer 157 will include an A/D circuit so that the signal on path 133 encodes a digital value.

The individual data item types provided to one node's multiplexer 157 will usually differ from that provided to another node. Accordingly, each data provider node must keep a list associating each data type code with number of the multiplexer's input channel which supplies it. This list is the data item channel (DIC) list maintained by element 146, and its contents are provided by the system's operator or installer. For each entry in the DIC list there is either the address of the multiplexer 157 channel to which is connected the data sensor supplying the data item having that entry's index as its data type code, or an absent sensor code which indicates that there is no data sensor attached to the multiplexer which supplies data items having the code which indexes the entry in the DIC list. This absent sensor code may be any convenient value which is an invalid input channel address.

It is also preferable to store a timer interval for each data item which a data provider node can supply, the timer interval specifying the interval prescribed by the operator between successive data messages for each data item. These timer intervals are stored in the timer interval list maintained by element 149 and whose inputs are also from the operator or installer on path 143b. The preferred embodiment requires each data type message to be transmitted not less frequently than a preselected maximum time (two minutes in the commercial embodiment).

When individual data sources are attached to the input channels of the multiplexer 157 in a particular data provider node, either when the node is installed or later, it is necessary to initialize the lists stored by elements 146 and 149. The installer keys in from a keyboard or keypad on path 143 the data type code and the timer interval for each sensor attached to an input channel of multiplexer 157 along with the address of that input channel. Path 143d carries the input channel portion of the information carried on path 143 and path 143b represents the timer interval value portion. Whenever additional sensors are attached, it is a simple matter to add the new sensor information to the DIC and timer interval lists stored by elements 146 and 149. If any of the currently attached sensors fail or are disconnected for some reason or the other, the operator can of course correct the DIC and timer interval lists by this process to reflect the current configuration of sensors on the input channels of multiplexer 157.

The first of the three major types of functions performed by data provider nodes is maintaining the GDM list. As the reader will recall from the discussion of the coordination master node in connection with FIG. 2A, there are two different ways in which the GDM list in a data provider node can be modified. In one case, the provider node has issued a data request message which has been accepted by the coordination master node and the data request acknowledge message sent in response acknowledges acceptance to the requesting node, which then modifies its GDM list accordingly. In the other case, the coordination master node broadcasts the GDM list and every master node then replaces its GDM list with the one just broadcast.

To take the data request acknowledge case first, this message is encoded in a signal directed to path 132 by communication interface 50. The data type code is carried on path 132a to the index cycle/select element 142 which provides the data type code on path 144 to list element 147 as the index to select the entry in the GDM list for loading of the address of the source for the new data item specified by the data request acknowledge message. This new data item source node address is in fact the *destination* node address in the data request acknowledge message. The accept/reject flag portion of the data request acknowledge message is applied on path 132b to the control terminal of gate 131. If the accept/reject flag specifies that the data request for which the data request acknowledge message is a response has been accepted, then gate 131 is conditioned thereby to allow the destination node address in the data request acknowledge message and carried on path 132a to pass to the GDM list entry specified by index element 142 on path 144. If the accept/reject flag specifies that the previously transmitted data request message was not accepted, then the gate 131 is disabled and does not allow the new source node address to be entered into the GDM list. After the GDM list has been altered in this fashion it is identical to the list maintained by the coordination master.

To correct any lists that may have become corrupted because of hardware or software errors and to inform potential provider nodes of unassigned data items which they might furnish, it is preferred to on occasion transmit the GDM list to all the nodes in a broadcast message. The GDM list broadcast message explained earlier in conjunction with the discussion of FIG. 2A contains the address of the node assigned to provide the data message for each data item, and is an exact duplicate of the GDM list stored in the coordination master GDM list element 65. The GDM list broadcast message is sensed by the communication interface 50 of each of the master nodes and carried by path 140 in each of the data provider nodes connected to the data bus 20. Within each of the nodes, the code which identifies the message as containing the GDM list is supplied to the cycle/select index element 142 which responds by sequentially generating the entire set of data type codes on path 144. These data type codes serve as indexes allowing individual entries of the GDM list in the message on path 140 to be sequentially stored in the corresponding entries of the GDM list element 147 in each of the data provider nodes. The functional format of the GDM list message is shown in FIG. 5A. The synchronization of the individual indexes' generation with the corresponding GDM list entry on path 140 requires only the conventional procedure of sensing each GDM list entry as it appears on path 140 and then storing it in the next sequential entry of the GDM list maintained by element 147. Note that many microprocessor devices have automatic input data storage functions to automatically perform this input data storage function, perhaps even while other instruction processing continues.

The second major function of the nodes mentioned above relating to their data provider activities is the actual providing of this data in periodic data messages. The interval between successive transmissions of each data item is specified by the value of the entry indexed by the corresponding data type code in the timer interval list maintained by element 149. The timer interval list and the timer count list maintained by element 148 are organized in a fashion very similar to that of the coordination master timer table maintained by element 67. In each entry of its timer count list, element 148 stores a count value which is periodically decremented by timer control element 152 and tested by test element 153 to determine if the specified interval between successive data messages has elapsed. To accomplish this, control/clock element 141 periodically provides a signal on path 145 which causes index cycle/select element 142 to cycle sequentially through all of the data type codes, successively placing them on path 144. This causes the count value currently recorded in the timer count list for that data item, to be placed on path 150. Timer test element 153 receives each of the count values on path 150 from timer counter list element 148 and accordingly as the value from element 148 is respectively unequal or equal to 0, provides a Boolean 0 or 1 on path 154. This Boolean signal is provided to timer control element 152 and as one input to AND gate 161.

Timer control element 149 controls decrement and reset operations for the count values stored by timer list element 148. Each Boolean 0 signal on path 154 causes element 152 to decrement by 1 the count value supplied on path 150 by element 148 and supply the decremented count value to element 148 to be stored in the entry specified by the index on path 144. Each Boolean 1 signal received on path 154 by control element 152 causes the interval value from the timer interval list maintained by element 149 and specified by the index on path 144 to be placed on path 151 from which element 152 causes it to be stored in the indexed entry of the timer count list. The result of these operations is that each count value cycles continuously between the associated interval value and 0. Each time 0 is reached, a Boolean 1 is applied briefly to one input of AND gate 161 and the timer count for that data type code is reset to the corresponding interval value.

The timer intervals stored by element 149 will invariably be set to some value shorter than the corresponding interval in the coordination master node's timer table. This is because the purpose of the timer table in the coordination master is to permit determining if a data provider is no longer providing data messages for the data item. Therefore typically a timer interval in the coordination master's timer table will be approximately two to three times as long as the timer interval in a data provider for the same data item.

The inputs to AND gate 161 control the issuance of the individual data messages. To issue a data message, two conditions must be simultaneously satisfied. The first has already been mentioned, and is that the timer interval for that data message kept by timer interval element 148 has elapsed since the last time the same data item was transmitted in a data message. Secondly, the GDM list entry for the data item must indicate that transmission of the data message for the data item has been assigned to the node in which the apparatus of FIG. 3 is embedded. It is relatively safe to assume that the GDM list maintained by the individual node to which the data item has been assigned does correctly specify the types of sensors attached to the node since it is likely that the system's operator will update the GDM list to reflect changes in the attached sensors as soon as they occur, see discussion above regarding operator input on path 143. When implemented in hardware the elements described here must be designed to simultaneously provide the two Boolean 1 inputs to AND gate 161 when the two conditions are satisfied for a particular data type code. In a software implementation, this might be accomplished by sequentially testing the two conditions and if both are satisfied during execution of the instructions accomplishing these tests, then execution is transferred to instructions causing a data message for the data type code provided by the index element 142. This is the software equivalent of resolving the potential "race" condition in hardware logic circuitry where care must be taken to assure that signals are synchronized when they are to be simultaneously tested.

To sense the second of these conditions, the GDM list entry test element 159 receives on path 59 the node address available from the node address register 51 and on path 137 the GDM list entry specified by the index on path 144 and if these two values are equal, then applies a Boolean 1 to the second input of AND gate 161. When Boolean 1 signals are present at both inputs of AND gate 161 then the AND gate output on path 168 has a Boolean 1 value which functions as an enable to cause communication interface 50 to accept the signals on path 169 as a data message. Path 169 carries the node address from path 59 and the digital sensor or data source value on path 133 from the multiplexer 157. The signal on path 133 is the output provided by the sensor or data source specified by the entry in the channel list stored in element 146 for the data item involved. The data item value along with the address of the node to which the sensor providing it is connected thus becomes available in the data message for all of the nodes on the system.

The third and last major function of the data provider nodes is to issue data request messages by which the issuing node requests responsibility from the coordination master node for providing data messages or relinquishes such responsibility if already granted. To request responsibility, in response to a GDM list broadcast message (path 140a) and possibly at periodic intervals as well under control of control/clock element 141 which provides an input signal on path 145, index element 142 is conditioned to cause the index provided as an output on path 144 to cycle through all of the possible data type code values. Each node address in the GDM list stored by element 147 is sequentially transmitted on path 137 while the index to it is present on path 144. As previously mentioned, a node address of zero denotes the data item as unassigned to a node, since in the design under consideration here uses only non-zero node addresses for existing nodes. Unassigned data item test element 160 detects whether a valid node address is present in the GDM list for the index comprising the data type code on path 144 and provides a Boolean 1 on path 164 when an invalid node address is present, i.e., there is no node currently providing the data item specified by the type code index on path 144. The data item channel (DIC) list entry corresponding to the index value on path 144 is encoded in a signal on path 156 and received and tested by channel number test element 155, which provides a Boolean 1 on path 158 if there is a valid channel number assigned to the data item type code whose index is carried on path 144.

AND gate 163 receives the Boolean values encoded on paths 158 and 164 and provides a Boolean 1 output on path 135 when both inputs are Boolean 1's. A Boolean 1 output from AND gate 163 is provided to OR gate 134, whose output on path 162 serves as an enable on path 166 to communication interface 50 for a data request message. The output on path 135 is also provided to the "1" control input of a multiplexer 136, causing multiplexer 136 to provide the node address value encoded on path 59 and presented at the "1" data input of multiplexer 136, in the signal encoded on the output path 167 of multiplexer 136. Thus, the node address of the data provider node involved merges with path 166 to become part of the data request message. The current data type code on path 144 is also merged into path 166 to complete the components of the data request message. In this manner a data request message which requests the coordination master node to grant it responsibility to provide data message to the system for the data type code currently present on path 144 is generated. When the node next becomes active, the communication interface 50 transmits the data request message to the coordination master who will process it as described in conjunction with FIG. 2A.

After one or more of the just-discussed type of data request messages have been sent by a provider node and accepted by the coordination master node, it is possible that the system operator may wish to delete the provider node's responsibility for data messages for a particular data item type. It is also possible that an application program running cooperatively with the control system under discussion within a node forming a part of it may determine that the output of a particular sensor attached to the multiplexer 157 of the node involved, is unreasonable, or this application program may simply wish to compare one sensor's output with another's of the same type. A feature of this invention discussed in connection with FIG. 2A is the ability at a node to specifically delete the responsibility for the node serving as the data provider for any particular data type. When this option is operator-instigated, the operator enters on path 143 the data type code for the data message responsibility to be deleted along with a delete code and a zero for the data item channel list entry specified by the data type code identifying the node involved as no longer assigned as a source for the data item specified by the data type code. The data type code provided by the operator is placed on path 143a and gated to path 144 by index element 142. The delete code may be generated by actuating a key dedicated to the purpose or may be generated in response to a digit sequence provided by the operator. In either case, the delete code is eventually represented by a Boolean 1 on path 143c. The Boolean signal on path 143c forms one input to an OR gate 134 whose output on path 162 when a Boolean 1 forms the enable signal for a data request signal. The signal on path 143c also forms an input to a second OR gate 139 which when encoding a Boolean 1, causes a corresponding Boolean 1 to be provided to the "0" control input of select node address multiplexer 136. When a Boolean 1 is provided on path 143c to the "0" control input of multiplexer 136, then the "0" data input on path 165 provides a node address of zero to the output path 167 and becomes the node address of the requesting node carried in the data request message. In this way the operator can cause a data request message to be issued with a node address of zero specified for any desired data type. The coordination master node receives this data request message and sets the source node for the data type specified in the data request message to zero and then transmits the GDM list broadcast message which clears the corresponding GDM list entry in each of the system's nodes, including the node which has relinquished responsibility for the data message involved. Further, in response to this message, if some other node has the capability, it will issue a data request message by which it assumes responsibility for issuing data messages for the data item type.

On this same theme, as mentioned already, it is also possible that an application program may provide outputs to delete a node's responsibility for a particular data item code. In this case, the application program provides a Boolean 1 signal on path 136a and the data type code for the data item involved on path 136b. Index element 142 gates the data type code on path 136b to path 144 where it serves as one component of the data request message and also selects the entry in the DIC list element 146. The application program must also provide a zero on path 136c which is received by element 146 and serves to remove the input port number of data multiplexer 157 from the DIC list entry for the data item type code. The Boolean 1 on path 136a causes a Boolean 1 to appear on path 138, and as described above in connection with operator-initiated deleting of a data message, selects path 165 to provide a zero at the "0" data input of multiplexer to provide the node address of zero required for the data request message. The Boolean 1 on path 136a also serves as the third input to OR gate 134 to generate the enable signal for the data request message. In this way it is possible for a separate application program to end the responsibility for supplying a particular data message for the node in which the program is executing.

ALARM MASTER NODES

Alarm master nodes are those having alarm gathering and annunciation capability, such as nodes 12 and 14 in FIG. 1. These nodes do not necessarily have alarm sensors connected to them, as for example with nodes 12 and 14 in FIG. 1. As mentioned above, alarm master nodes, or alarm masters as they will be frequently called, gather alarms which have been logged or sensed by other nodes, for example nodes 11, 12, etc. in FIG. 1. A typical alarm node is shown in functional block diagram form in FIG. 4. It should be realized that there may be a number of alarm masters on a network or only one. Analogous to the coordination master node serving as a data provider, the coordination master node may also be an alarm master. In this case the communications to be described involving alarm master functions are between the alarm master functional portion of the coordination master node and the coordination master functions of the coordination master node, and are under control of the communication interface 50 for the coordination master node.

There are three kinds of functions which each alarm master must perform. These are: changing responsibility for gathering and annunciating particular classes of alarms; receiving and acknowledging individual alarm messages; and annunciating alarms to the operator.

The first of these functions, changing responsibility for handling alarms for a class, occurs interactively with the coordination master described in FIGS. 2A and 2B. This function is initiated with the the issuance of alarm request messages by nodes having alarm master capability, so it is convenient to start the discussion with the alarm request message generation. A scheduler 194 which may form a part of the node's control element has overall responsibility for operation of the alarm master and for the testing which determines when an alarm request message should be issued. Typically, as explained above, this scheduler comprises software-controlled activities of the microprocessor in the node. There may be a table of tasks maintained within the node which specifies the preferred interval between successive operations for all of the tasks which the node must perform, and which the scheduler uses in selecting the timing and order in which individual tasks are done. Among these tasks in alarm masters is issuing alarm requests.

When the alarm request task is selected, scheduler 194 transmits a reset signal on path 174 which causes the contents of an alarm class code (ACC) register 175 to be set to the smallest ACC value. Recall that the ACC values run sequentially through a series of integers, for example from one to eight if there are eight different alarm classes. Scheduler 194 also transmits an initiate signal on path 200 to an alarm request generation element 186 which conditions element 186 to function in the alarm request generation sequence.

During alarm request generation, it is necessary for the node involved to make two different tests. One is whether it is authorized or capable of performing as an alarm master for the ACC in the ACC register 175. This information is maintained by an alarm class priority/capability (ACPC) list element 177 which is organized so that in each alarm master node the ACC in the ACC register 175 forms an index to the entries in element 177, where the indexed entry contains the priority assigned to that node for the ACC which indexes that entry. It is convenient to define one priority value as indicating that the alarm master does not have the capability of processing alarms belonging to the class whose code indexes entries in the ACPC list containing that value. This is in a sense the "lowest" priority a node may have for processing alarms of a particular class.

The ACPC entries maintained by element 177 are initially provided on path 176 by the operator or installer, typically from a keyboard if a personal computer serves as the node or from a keypad or other data entry device otherwise. When setting these priority values, the ACC entered by the operator is supplied on path 176a to register 175 for indexing purposes and the priority value is supplied on path 176b for entry in the ACPC list. Some designs for the system may allow the values in this table to be remotely supplied from another node also, but this is not shown. This does not affect the operation of the individual alarm master nodes other than as to the source of the information in the ACPC list.

A second test which is performed to determine whether an alarm request message should be transmitted for the current ACC value involves testing the priority assigned to the node involved against the priority of the node currently serving as the alarm master. The priority for the node involved of course is contained in the ACPC list element 177. The alarm class priority (ACP) list maintained by element 210 in each alarm master node specifies the current node's priority for the ACC stored in register 175 and which indexes the list in element 210. Each alarm master node or potential alarm master node in its element 210 stores a copy of the alarm class priority list stored in element 105 (FIG. 2B) of the coordination master node. The priority lists in elements 105 and 210 are organized similarly, and both lists' index structure is identical to that of the ACPC list, so that the ACC value on path 178 can index the related priority values in elements 177 and 210.

In response to the ACC encoded in the signal on path 178, list elements 177 and 210 supply to the alarm request generation element 186 these priority values. Element 186 tests whether the value on path 185 indicates the lack of capability of the node to serve as the alarm master for the class specified by the ACC on path 178. If the node cannot serve as an alarm master for the class, no enable is issued on path 188, and element 186 provides a Boolean 1 signal on path 196 to OR gate 197. OR gate 197 responds with a signal on path 195 causing the value of the ACC register 175 contents to increment, to permit processing for the next larger ACC value. If the contents of ACC register 175 after incrementation is larger than the largest allowable ACC value, then the alarm request processing task has been completed and scheduler 194 is signaled to begin a new task.

Element 186 also tests the priority value from element 177 against the value from element 210, and if the priority value provided by element 177 indicates lower or equal priority than the value in element 210 indexed by the ACC, then the contents of the ACC register is advanced to the next higher value by setting a Boolean 1 on path 196 without sending an enable signal on path 188a. However, if both of these tests are passed, then element 186 does provide an enable signal on path 188a to prompt an alarm request message. Element 186 also supplies a signal on path 215 to the "1" control input of a node address selector 214, which gates the node address for the node involved to path 216 for inclusion in the alarm request message. When all of the components of the alarm request message have been assembled and the node is active, then communication interface 50 transmits the alarm request message on the data bus 20. Element 186 of course receives each incremented ACC value on path 178 whether an alarm request enable is issued or not, and if this ACC value is larger than the largest allowable ACC value, then the alarm request processing task has been completed and the scheduler 194 is signaled on path 201 to begin a new task. If not, then the alarm request generation sequence continues.

There is also in the alarm request message generation function, the ability for a system operator to delete a node from the ACA list for a particular alarm class. This function is performed in much the same way that nodes are deleted as data providers. The operator provides a delete flag input on path 176c which indicates that the node serving as alarm master for the alarm class whose ACC is provided by the operator on path 176a, is to be deleted. The ACC is also provided to the ACC register 175 on path 176a by the operator. The delete flag input on path 176c is provided to the "0" control input of selector 214 which causes the node address of zero on path 213 and available at data input "0" of selector 214 to be selected and gated to path 216 to form a part of the alarm request message path 188. The delete flag on path 176c is also provided to element 186 which responds by generating an enable signal on path 188a to prompt the communication interface 50 to issue an alarm request message with a node address of zero. Alternatively, various application programs may also provide a node delete flag to the "0" input of selector 214 and to element 186 and an ACC on path 176a to delete the node selected as alarm master for the alarm class specified by the ACC.

In normal operation, the coordination master responds to each alarm request message with an alarm request acknowledge (ARA) message, which is received by each communication interface 50. Recall that the ARA message format is shown in FIG. 5A, and includes an accept/reject flag field specifying whether the particular alarm request message was accepted. If the ARA message has a destination node address equal to the contents of the node address register 59 for the node then the communication interface 50 provides the ARA message on path 172 for further processing by the node. The accept/reject flag and the node address from the ARA message are provided on paths 172a and 172b respectively to an ACA list update element 173. The ACC in the ARA message is supplied on path 172c as an index to the ACA and ACP list elements 181 and 210. If the accept/reject flag field carried on path 172a specifies that the alarm request message to which this ARA message is the response was accepted, then element 173 supplies a signal to the ACA list element 181 causing the entry in the ACA list indexed by the ACC on path 172c to be set to the contents of the node address register carried on path 59. The update element 173 also causes the priority value indexed in the ACP list of element 210 by the ACC on path 173c to be set to the priority value indexed in the ACPC list of element 177 by the path 173c ACC. After these operations are complete, the ACA and ACP lists in the alarm master node involved will exactly correspond to the ACA and ACP lists in the coordination master node. Upon completing these activities, the alarm master node to which the ARA message was directed is conditioned to process alarms for the alarm class involved until its ACA and ACP lists are modified to designate another node as responsible for the alarm class.

Figure 4:
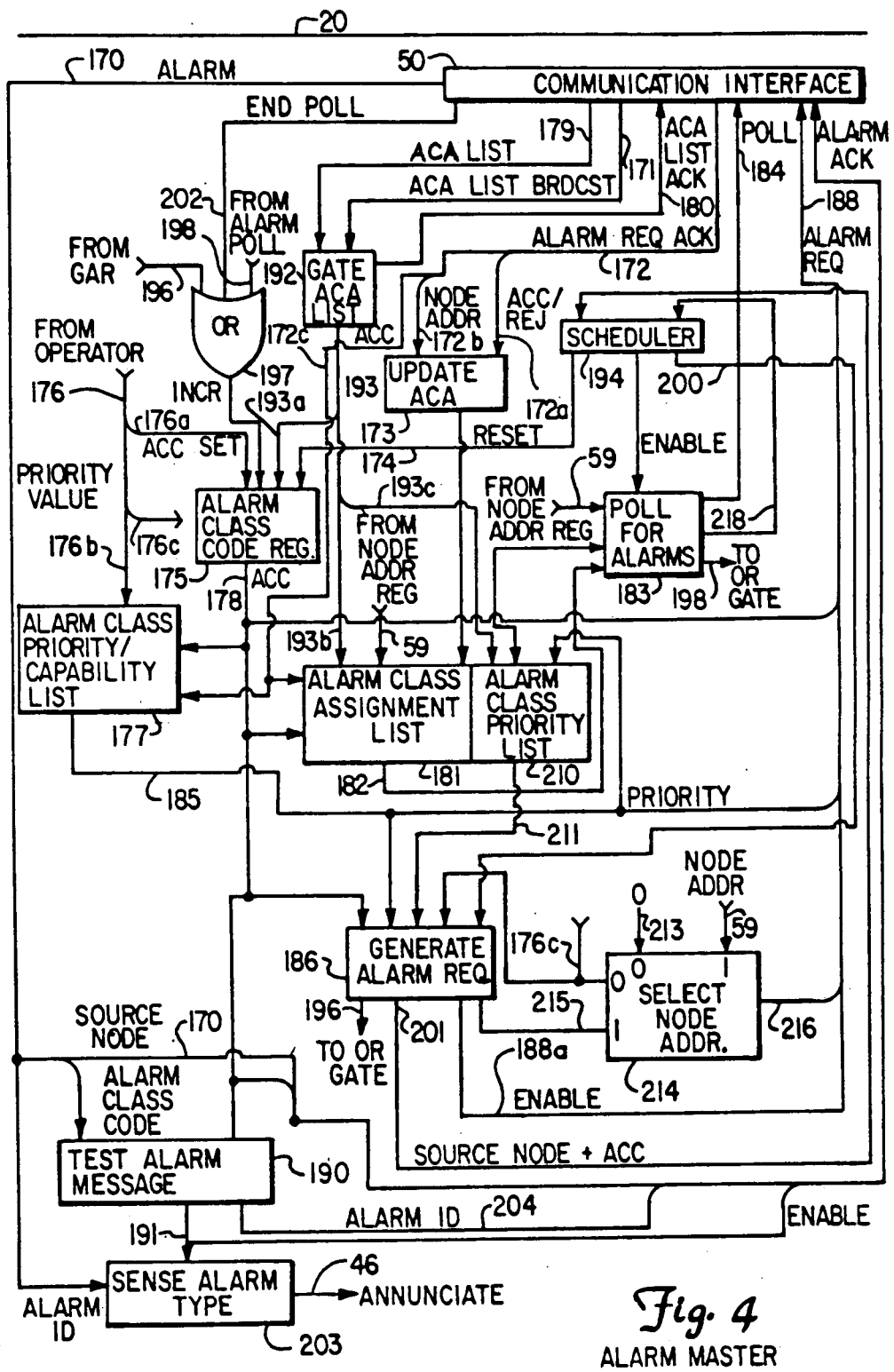
FIG. 4 is a functional block diagram of the master node functions providing the alarm master request and processing operations of the invention.

Whenever a node different from the node shown in FIG. 4 gains or is deleted from responsibility for serving as the alarm for a particular alarm class, it is necessary to communicate this fact to the remaining nodes in the system. In this embodiment, there are two different ACA and ACP list transmissions each time alarm master responsibility is changed, much the same as is done for a change in data item message responsibility. As previously explained, the coordination master transmits the ACA list and ACA list broadcast messages each time there is a change in alarm master responsibility. The purpose of this is to indicate to all of the nodes on the network the current status of alarm master responsibility and alarm master priority for each alarm class.

When an ACA list broadcast message is transmitted each alarm master receives it from communication interface 50 and encodes it in a signal on path 171 to an ACA list gate 192. Gate 192 places the ACA list broadcast message on a data path 193, from which the addresses of the nodes having responsibility for the individual alarm classes are provided in a signal on path 193b to element 181 for storing in the ACA list. The priorities of the individual nodes assigned as masters for individual alarm classes are provided in a signal on path 193c to element 210 for storing in element 210. A signal is also provided on path 193a causing ACC register 175 to cycle through the entire set of ACCs while the associated node addresses and priority values appear on paths 193b and 193c so as to allow the values to be correctly stored within elements 181 and 210.

To assure that any node whose alarm master responsibility has been deleted for a particular alarm class, has been conditioned to no longer serve as that class's alarm master node, it is also a feature of this embodiment that an ACA list message requiring an acknowledge message is directed to the deleted node. This activity has been discussed in some detail in connection with FIG. 2B. Thus, if the node shown in FIG. 4 has been deleted as the alarm master for a particular alarm class, an ACA list message is provided to communication interface 50 which encodes it in a signal on path 179. The ACA list message is then processed in exactly the way just explained for the ACA list broadcast message, with the result that the ACA and ACP lists in elements 181 and 210 have been updated to be identical to the same lists in the coordination master node. In addition, an ACA list acknowledge message enable is sent on path 180 to the communication interface 50 and directed to the coordination master node, whose own communication interface 50 senses the acknowledge and proceeds to other tasks. Until the ACA list message is sent, both the old and new alarm master nodes have responsibility for alarms of the class involved. Worst case, this condition will exist only until the coordination master node once again becomes active, at which time it will send these ACA list messages and thereby terminate the old node's activity with respect to the alarm class. It is not believed that any harm results from this temporary dual responsibility for a particular alarm class because it exists for only a short time and because there is no risk that an alarm will be undetected.

The second of the major function classes to be performed by alarm masters is processing actual alarm messages, viz., requesting, receiving and acknowledging individual alarm messages. There are three types of messages involved in this function. The first is the alarm poll message(s). In the design involved here, individual nodes do not initiate alarm messages as alarm condition signals are received from the sensors. The reason for this is that it is convenient to attach alarm sensors to slave nodes, and by convention of the protocol, slave nodes cannot initiate messages on the network. Since it is likely that most installations will have a large number of alarm sensors, it is most cost efficient if the cheapest type of node handles these alarm sensors, and the slave nodes, having little capability compared to the master nodes, are the cheapest.

To elicit alarm messages, a polling technique is performed by the communication interface 50 at the direction of an alarm polling element 183 which allows the alarm masters to request all nodes which have logged alarm conditions which have not been acknowledged by an alarm master, to transmit alarm messages. The details of alarm polling is far beyond the scope of this invention but it is useful to understand the main features of it in order to better understand the operation of alarm masters. At predetermined intervals for each alarm class, when the alarm master to which the alarm class responsibility has been granted becomes active it polls all of the nodes on the network, requesting each to respond with an alarm message for each alarm condition of the class involved, and which has not been acknowledged with a specific alarm acknowledge message. Since alarms are likely to be a relatively rare occurrence, most alarm polls will result in either no alarm messages or one alarm message. In the rare cases where two or more alarm messages are transmitted simultaneously, there is a procedure to resolve the resulting collision of alarm messages on the data bus 20. It can be seen from the discussion in the aforementioned U.S. patent application Ser. No. 07/303,416 that collisions of individual messages can be detected by analysis of the individual message preambles. Further, alarm master nodes have the capability of transmitting alarm polling messages which are directed to all nodes having addresses within a specified range. By sequentially adjusting the range until only a single message is received, and then transmitting an alarm acknowledge message which conditions the node transmitting the alarm message to cease further transmission of the acknowledged alarm message, it is possible for every alarm message to be transmitted by its originating node during the polling process without a collision with another message from a different node. The result of the polling procedure is that each node having alarms of the particular class will transmit an alarm message without collision which the communication interface 50 provides on path 170. The functional format for alarm messages is shown in FIG. 5B. Note that there may be one or more alarm ID codes in a single message. Each ID code signifies a different kind of alarm condition logged by the node transmitting the alarm message. All of the alarm ID codes apply to the ACC specified in the alarm message.

Polling for alarms starts with an enable signal from scheduler 194 to alarm polling element 183. The polling procedure may be initiated either at preset clock times or after a preset number of consecutive instances of the node receiving the token message. In response, element 183 supplies a reset signal on path 174 causing the contents of ACC register 175 to be set to the lowest ACC. Since polling is conducted on an alarm class by alarm class basis, it is necessary for alarm polling element 183 to sequence through all alarm classes in order to identify every class for which the alarm master has responsibility. To accomplish this, element 183 receives on path 182 the node address in the ACA list from element 181 indexed by the ACC code in register 175 on path 178. If the node address on path 182 is not equal to the node's address on path 59, then the alarm class is one for which the node does not have responsibility and no polling for this alarm class is done by the node. A signal is placed on path 198 to cause the contents of ACC register 175 to be incremented. This occurs through the action of OR gate 197 in the same way that element 186 causes the contents of the ACC register to increment during alarm request generation.

If equality is detected between the node address carried in the signal on path 59 and the node address supplied from list element 181 as indexed by the ACC from register 178, then alarm polling for the class is initiated with polling element 183 supplying an alarm poll signal to the interface 50. The alarm poll signal specifies the alarm class code, which must be included in the alarm polling messages generated by the communication interface 50. Communication interface 50 in response to the alarm poll signal on path 184 commences alarm polling. In response to the alarm polling procedure, each node which has logged at least one alarm for which it has not received an alarm acknowledge message will eventually respond to an alarm poll message with a clean alarm message which does not collide with any other messages. Communication interface 50 continues to issue alarm polling messages until there is no response in the form of another alarm message. This condition is then signalled by interface 50 which places a Boolean 1 signal on path 202 causing OR gate 197 to issue an increment signal to ACC register 175. Eventually the contents of the ACC register 175 is incremented to a value one greater than the largest ACC value allowed. Polling element 183 detects this condition and ceases polling, informing scheduler 194 of this condition via path 218. Scheduler 194 can then proceed to other activities.

Each alarm message received by communication interface 50 is encoded in a signal on path 170 having the functional structure shown in FIG. 5B. The ACC contained in the alarm message is applied to the alarm test element 190 along with the contents of the ACC register 175 on path 178. If the two ACC's so applied are equal to each other, then the alarm message has been properly generated and processed in response to the alarm poll signal and the alarm is one for which the active alarm master has responsibility. Test element 190 signals this condition by generating an alarm acknowledge message for each alarm ID in the alarm message. This involves placing a signal on path 191 which functions as an enable signal with which merges the source node address, the alarm class code, and one alarm ID code from the alarm acknowledge message as path 209. The source node address from the alarm message becomes the destination node address in the alarm acknowledge message(s) on path 209. As the node originating the alarm message receives each alarm acknowledge message, it removes the alarm whose ID code is present in the alarm acknowledge message from its alarm queue.

Upon receiving each alarm message, the alarm master node can also perform its third function, that of annunciating alarms. The condition originally sensed by the source node's alarm sensor is defined by the digit pattern in the alarm ID code field of the alarm message. Element 203 receives the alarm ID code from the alarm message, decodes it, and responsive to the enable signal on path 191, transmits an appropriate signal to a display device on path 46. The display device may be a printer, CRT screen, a panel of lights, or any other convenient means of communicating with the human operator.

It can be seen from the foregoing discussion that it is possible to provide data messages from any node capable of originating them, and that a particular type of data item will always be available for nodes in a system of this type unless there are no nodes on the system capable of supplying the data item. Similarly, alarms will always be processed by some node in the system unless there are no nodes present on the system which are capable of processing alarms of that class. Accordingly, it can be seen that individual failures of nodes will not greatly affect overall function of the system, and that the configuration of the system can be altered while in use without affecting its performance in any important aspect.

What we claim is:

1. In a communications network comprising a plurality of nodes having data transmission and receiving capabilities and all connected for data communication with each other using a data bus comprising a signal conductor, each of the nodes having a node address register in which is stored a unique node address by which each of the nodes may be identified, and each of the nodes of the type periodically entering active mode intervals during which active mode intervals the node may provide on the data bus to the other nodes, signals encoding a plurality of different messages, said messages including status messages of at least a first type, and wherein at least two nodes are capable of functioning as source nodes for at least the first type of status message, an improvement for coordinating the responsibility for transmitting on the bus a status message of the first type, wherein one of the nodes comprises a coordinator node having a memory in which is stored a status message source list associating with at least the first type of status message, the node address of one source node for the first type of status message, said coordinator node including means for transmitting on the data bus a status message source message specifying for at least the first status message type the node address of the source node associated therewith in the status message source list; and wherein each of the status message source nodes includes means for transmitting on the data bus at least the first type of status message responsive to a status message source message transmitted on the data bus by the coordinator node and in which status message source message is associated with the first status message type, a node address equal to the contents of the source node's node address register.

2. The communications network of claim 1, wherein the source nodes each include means for transmitting a request message on the data bus, said request message specifying with a predetermined code therefor a status message type and including the node address in the node address register of the node transmitting the request message; and wherein the coordinator node includes means responsive to a request message for entering the node address in the request message into the status message source list in association with the status message type specified by the request message.

3. The communications network of claim 2, wherein the coordinator node includes means for sensing presence in the status message source list of a node address associated with the status message type specified by the predetermined code therefor in the request message, and responsive thereto leaving unchanged the node address in the status message source list associated with the status message type specified by the request message.

4. The communications network of claim 2, wherein the coordinator node includes means for transmitting a status message source message responsive to a request message, said status message source message including the node address specified in the request message.

5. The communications network of claim 4, wherein the means for transmitting a status message source message includes means for specifying an association between the node address specified in the request message and the status message type specified in the request message.

6. The communications network of claim 4 wherein the coordinator node includes means for encoding in the status message source message at least a portion of the status message source list.

7. The communications network of claim 2 wherein the coordinator node includes means for encoding in the status message source message at least a portion of the status message source list.

8. The communications network of claim 2, wherein the coordinator node includes means for transmitting a status message source message encoding at least parts of the status message source list responsive to entry of a node address into the status message source list.

9. The communications network of claim 2, wherein the coordinator node includes means for identifying with a predetermined code in the status message source list, status message types with which are associated no node address, and for encoding the status message source list in the status message source message; and wherein a source node includes means for providing a request message for a certain type of status message responsive to a status message source message, said certain type of status message being of the type which the source node can provide, and said request message specifying the certain type of status message.

10. The communications network of claim 9, wherein the means for identifying in the status message source list status message types with which are associated no node address includes means for inserting in entries of the status message source list associated with said status message types, a predetermined digital value.

11. The communications network of claim 2, wherein a source node includes means for including in its messages on the data bus the contents of the source node's node address register, and wherein the coordinator node includes means for including a node activity index for each status message type in the status message source list, and responsive to each message on the data bus, presetting to a predetermined value the node activity index for each status message type with which the node address in the message is associated, and responsive to the coordinator node becoming active, altering the value of the node activity index, and responsive to a predetermined number of consecutive alterations of a certain node activity index without it being preset to the predetermined value, removing from the status message source list the association of the node address with the status message type associated with the certain node activity index.

12. The communications network of claim 11, wherein the means for including a node activity index in the status message source list includes means for including a timer entry for each status message type, and for altering the timer entry contents at predetermined intervals.

13. The communications network of claim 2, wherein the coordinator node includes means for including a node activity index for the first status message type in the status message source list, and responsive to the transmission of the first status message type on the data bus, setting to a predetermined value the node activity index for the first status message type transmitted, and the coordinator node further includes means for altering the value of the node activity index at predetermined intervals, and responsive to a predetermined number of consecutive alterations of the node activity index for a certain type of status message, removing from the status message source list the association of the node address with the first status message type.

14. The communications network of claim 13, wherein a source node includes means for providing as the status message type the transmission of a predetermined data item message on the data bus.

15. The communications network of claim 13, wherein a source node includes means for providing as the status message type the transmission of a predetermined alarm message on the data bus.

16. The communications network of claim 2, wherein a source node includes means for providing as the status message type the transmission of a predetermined data item message on the data bus.

17. The communications network of claim 2, wherein a source node includes means for providing as the status message type the transmission of a predetermined alarm message on the data bus.

18. The communications network of claim 2, wherein a plurality of status message source nodes each include means for storing a priority value for the first status message type for which the node is a source, and for including the priority value in a request message for the first status message type; and wherein the coordinator node means responsive to a request message includes means for storing the request message's priority value in the status message source list in association with the status message type specified in the request message.

19. The communications network of claim 18, wherein the coordinator node's priority value storing means includes means for receiving request messages in which are included a priority value, and for replacing the node address and the priority value currently associated with the status message type in the status message source list with the node address and priority value in the request message responsive to the priority value in the status message source list associated with the status message type specified by the request message being lower than the priority value in the request message.

20. The communications network of claim 1, wherein a status message source node includes means for including the contents of its node register in each status message which it transmits, and wherein the coordinator node includes means receiving the status messages from the data bus, and responsive to inequality between the node address in the current status message and the node address in the status message source list associated with the type of the current status message, for transmitting a status message source message including at least parts of the status message source list.

21. The communications network of claim 20, wherein the coordinator node includes means for transmitting responsive to inequality between the node address in the current status message and the node address in the status message source list associated with the type of the current status message, a status message source message specifying the status message type and the node address in the current status message, and wherein each source node includes means responsive to a status message source message specifying the contents of the source node's node address register, for transmitting status messages of the type specified for the source node by the status message source message.

22. The communications network of claim 1, wherein a source node includes means for transmitting a request message on the data bus, said request message specifying with a predetermined code therefor a status message type with which is associated a predetermined delete code; and wherein the coordinator node includes means responsive to said request message for deleting the node address in the status message source list associated with the status message type specified by the request message.

23. The communications network of claim 22, wherein a source node includes means responsive to a status message source message identifying status message types with which are associated deleted node addresses, for issuing a request message including the node address in the node address register of the source node transmitting the request message and specifying with a predetermined code a status message type with which is associated in the status message source message a deleted node address; and wherein the coordinator node includes means responsive to a request message including a predetermined delete code for transmitting a status message source message identifying status message types with which are associated deleted node addresses, and means responsive to a request message including a node address and specifying with a predetermined code a status message type with which is associated a deleted node address, for entering the node address in the request message into the status message source list in association with the status message type specified by the request message.

24. The communications network of claim 23, wherein the coordinator node includes means responsive to a request message including a node address and specifying with a predetermined code a status message type with which is associated a deleted node address, for transmitting a status message source message encoding at least parts of the status message source list.

25. The communications network of claim 24, wherein the the coordinator node includes means for transmitting a status message source message encoding at least parts of the status message source list responsive to entry of a node address into the status message source list.

* * * * *